(12) United States Patent
Gordon et al.

(10) Patent No.: US 8,743,778 B2
(45) Date of Patent: Jun. 3, 2014

(54) SYSTEMS AND METHODS FOR OBTAINING NETWORK CREDENTIALS

(75) Inventors: John Gordon, Alameda, CA (US); David Whedon Kimdon, Corvallis, OR (US)

(73) Assignee: Devicescape Software, Inc., San Bruno, CA (US)

( * ) Notice: Subject to any disclaimer, the term of this patent is extended or adjusted under 35 U.S.C. 154(b) by 209 days.

(21) Appl. No.: 12/823,078

(22) Filed: Jun. 24, 2010

(65) Prior Publication Data

US 2011/0047603 A1 Feb. 24, 2011

Related U.S. Application Data

(63) Continuation-in-part of application No. 12/240,920, filed on Sep. 29, 2008, which is a continuation-in-part of application No. 11/899,739, filed on Sep. 6, 2007, now Pat. No. 8,196,188.

(60) Provisional application No. 61/220,073, filed on Jun. 24, 2009, provisional application No. 60/976,344, filed on Sep. 28, 2007, provisional application No. 60/824,756, filed on Sep. 6, 2006.

(51) Int. Cl.
H04W 4/00 (2009.01)
(52) U.S. Cl.
USPC .......................................... 370/328; 370/338
(58) Field of Classification Search
CPC ..................... H04L 61/1511; H04L 29/12066; H04L 63/1433; H04L 63/145; H04L 63/1416
USPC .......................................... 370/311, 328, 338
See application file for complete search history.

(56) References Cited

U.S. PATENT DOCUMENTS

| | | | |
|---|---|---|---|
| 6,151,628 A | 11/2000 | Xu et al. | |
| 6,161,185 A | 12/2000 | Guthrie et al. | |
| 6,233,577 B1 | 5/2001 | Ramasubramani et al. | |
| 6,799,038 B2 | 9/2004 | Gopikanth | |

(Continued)

FOREIGN PATENT DOCUMENTS

| | | |
|---|---|---|
| EP | 1770940 | 4/2007 |
| GB | 2441350 | 3/2008 |

(Continued)

OTHER PUBLICATIONS

Zündt et al. "Seamless Handoff in Community Based and Location Aware Heterogeneous Wireless Networks," 8th International Workshop on Mobile Multimedia Conference, Oct. 5-8, 2003, pp. 1-5, XP002281321.

(Continued)

Primary Examiner — Jung Park
(74) Attorney, Agent, or Firm — Sheppard, Mullin, Richter & Hampton LLP

(57) ABSTRACT

Systems and methods for obtaining network credentials are disclosed. In some embodiments, a method comprises receiving, with a digital device, a network identifier from a network device, providing a first credential request including the network identifier to another digital device on a network, receiving a request for additional network information from the other digital device, providing a second credential request including additional network information to the other digital device, receiving a credential request response including network credentials from the other digital device, and providing the network credentials from the credential request response to a network device.

20 Claims, 18 Drawing Sheets

(56) References Cited

U.S. PATENT DOCUMENTS

| | | | |
|---|---|---|---|
| 6,822,955 B1 * | 11/2004 | Brothers et al. | 370/389 |
| 6,871,284 B2 | 3/2005 | Cooper et al. | |
| 6,892,230 B1 | 5/2005 | Gu et al. | |
| 6,961,857 B1 | 11/2005 | Floryanzia | |
| 7,243,369 B2 | 7/2007 | Bhat et al. | |
| 7,286,113 B1 | 10/2007 | Lapstun et al. | |
| 7,360,087 B2 | 4/2008 | Jorgensen et al. | |
| 7,395,083 B2 | 7/2008 | Buckley | |
| 7,409,543 B1 | 8/2008 | Bjorn | |
| 7,437,755 B2 | 10/2008 | Farino et al. | |
| 7,457,950 B1 | 11/2008 | Brickell et al. | |
| 7,461,257 B2 | 12/2008 | Olkin et al. | |
| 7,469,139 B2 | 12/2008 | van de Groenendaal | |
| 7,543,045 B1 | 6/2009 | Agrawal et al. | |
| 7,568,220 B2 | 7/2009 | Burshan | |
| 7,661,128 B2 | 2/2010 | Chen et al. | |
| 7,685,264 B2 | 3/2010 | Tumsi Dayakar et al. | |
| 7,810,143 B2 | 10/2010 | Ruzyski et al. | |
| 7,827,252 B2 | 11/2010 | Hopmann et al. | |
| 7,898,977 B2 | 3/2011 | Roese et al. | |
| 7,920,531 B2 | 4/2011 | Gupta et al. | |
| 7,930,384 B1 | 4/2011 | Lester et al. | |
| 8,005,218 B2 | 8/2011 | Keeler et al. | |
| 8,074,259 B1 | 12/2011 | Levy et al. | |
| 8,285,992 B2 | 10/2012 | Mathur et al. | |
| 8,453,225 B2 | 5/2013 | Agarwal et al. | |
| 2001/0034837 A1 | 10/2001 | Kausik et al. | |
| 2002/0116642 A1 | 8/2002 | Joshi et al. | |
| 2002/0176366 A1 | 11/2002 | Ayyagari et al. | |
| 2002/0194501 A1 | 12/2002 | Wenocur et al. | |
| 2002/0199096 A1 | 12/2002 | Wenocur et al. | |
| 2003/0004994 A1 | 1/2003 | Kamrowski et al. | |
| 2003/0096595 A1 | 5/2003 | Green et al. | |
| 2003/0097592 A1 | 5/2003 | Adusumilli | |
| 2003/0135765 A1 | 7/2003 | Hind et al. | |
| 2003/0163740 A1 | 8/2003 | Thjai et al. | |
| 2003/0169713 A1 | 9/2003 | Luo | |
| 2003/0188201 A1 | 10/2003 | Venkaramappa | |
| 2003/0204748 A1 | 10/2003 | Chiu | |
| 2003/0217137 A1 | 11/2003 | Roese et al. | |
| 2004/0003060 A1 | 1/2004 | Asoh et al. | |
| 2004/0003081 A1 | 1/2004 | Justus | |
| 2004/0031058 A1 | 2/2004 | Reisman | |
| 2004/0103282 A1 * | 5/2004 | Meier et al. | 713/171 |
| 2004/0105433 A1 | 6/2004 | Seo | |
| 2004/0122959 A1 | 6/2004 | Lortz | |
| 2004/0162818 A1 | 8/2004 | Shaw | |
| 2004/0168090 A1 | 8/2004 | Chawla et al. | |
| 2004/0193707 A1 | 9/2004 | Alam et al. | |
| 2005/0021781 A1 | 1/2005 | Sunder et al. | |
| 2005/0059416 A1 | 3/2005 | Ono | |
| 2005/0066033 A1 | 3/2005 | Cheston et al. | |
| 2005/0097051 A1 | 5/2005 | Madill, Jr. et al. | |
| 2005/0144237 A1 | 6/2005 | Heredia et al. | |
| 2005/0147060 A1 | 7/2005 | Buckley | |
| 2005/0177750 A1 | 8/2005 | Gasparini et al. | |
| 2005/0232189 A1 | 10/2005 | Loushine | |
| 2005/0232209 A1 | 10/2005 | Buckley et al. | |
| 2005/0246431 A1 | 11/2005 | Spitaels | |
| 2005/0260973 A1 | 11/2005 | van de Groenendaal | |
| 2006/0020684 A1 | 1/2006 | Mukherjee et al. | |
| 2006/0026289 A1 | 2/2006 | Lyndersay et al. | |
| 2006/0047830 A1 | 3/2006 | Nair et al. | |
| 2006/0048213 A1 | 3/2006 | Cheng et al. | |
| 2006/0048214 A1 | 3/2006 | Pennington et al. | |
| 2006/0069782 A1 | 3/2006 | Manning et al. | |
| 2006/0123133 A1 | 6/2006 | Hrastar | |
| 2006/0130140 A1 | 6/2006 | Andreev et al. | |
| 2006/0135155 A1 | 6/2006 | Chung et al. | |
| 2006/0142034 A1 | 6/2006 | Wentink et al. | |
| 2006/0149844 A1 | 7/2006 | Droz et al. | |
| 2006/0174127 A1 | 8/2006 | Kalavade et al. | |
| 2006/0187858 A1 | 8/2006 | Kenichi et al. | |
| 2006/0200503 A1 | 9/2006 | Dosa et al. | |
| 2006/0215622 A1 | 9/2006 | Abdel-Kader et al. | |
| 2006/0221919 A1 | 10/2006 | McRae et al. | |
| 2007/0011725 A1 | 1/2007 | Sahay et al. | |
| 2007/0019670 A1 | 1/2007 | Falardeau | |
| 2007/0054654 A1 | 3/2007 | Jones | |
| 2007/0073817 A1 | 3/2007 | Gorty | |
| 2007/0076612 A1 | 4/2007 | Iyer et al. | |
| 2007/0081477 A1 * | 4/2007 | Jakkahalli et al. | 370/310 |
| 2007/0091861 A1 | 4/2007 | Gupta et al. | |
| 2007/0113269 A1 | 5/2007 | Zhang | |
| 2007/0124490 A1 | 5/2007 | Kalavade et al. | |
| 2007/0127423 A1 | 6/2007 | Ho | |
| 2007/0171910 A1 * | 7/2007 | Kumar | 370/392 |
| 2007/0209065 A1 | 9/2007 | Branam et al. | |
| 2007/0255834 A1 | 11/2007 | Abhishek et al. | |
| 2007/0256122 A1 | 11/2007 | Foo et al. | |
| 2007/0270129 A1 | 11/2007 | Luo | |
| 2007/0275701 A1 * | 11/2007 | Jonker | 455/414.1 |
| 2007/0300309 A1 | 12/2007 | Naito | |
| 2008/0008121 A1 | 1/2008 | Alizadeh-Shabdiz | |
| 2008/0016230 A1 | 1/2008 | Holtmanns et al. | |
| 2008/0037715 A1 | 2/2008 | Prozeniuk et al. | |
| 2008/0060064 A1 | 3/2008 | Wynn et al. | |
| 2008/0060065 A1 | 3/2008 | Wynn et al. | |
| 2008/0144589 A1 | 6/2008 | Buckley | |
| 2008/0189788 A1 | 8/2008 | Bahl | |
| 2008/0195741 A1 | 8/2008 | Wynn et al. | |
| 2008/0225749 A1 | 9/2008 | Peng et al. | |
| 2008/0276305 A1 | 11/2008 | Chan et al. | |
| 2008/0281716 A1 | 11/2008 | Nagoya et al. | |
| 2009/0024550 A1 | 1/2009 | Wynn et al. | |
| 2009/0028082 A1 | 1/2009 | Wynn et al. | |
| 2009/0031125 A1 | 1/2009 | Bjorn | |
| 2009/0085806 A1 | 4/2009 | Piersol et al. | |
| 2009/0147792 A1 | 6/2009 | Anschutz et al. | |
| 2009/0177801 A1 | 7/2009 | Chambers, Jr. et al. | |
| 2009/0222537 A1 | 9/2009 | Watkins et al. | |
| 2009/0222740 A1 | 9/2009 | Yuan | |
| 2009/0279492 A1 | 11/2009 | Montemurro et al. | |
| 2010/0066839 A1 | 3/2010 | Azuma et al. | |
| 2010/0100951 A1 * | 4/2010 | Kutt et al. | 726/9 |
| 2010/0142484 A1 * | 6/2010 | Bachmann et al. | 370/331 |
| 2010/0153704 A1 | 6/2010 | Winslow | |
| 2010/0275249 A1 | 10/2010 | McCann et al. | |
| 2012/0058793 A1 | 3/2012 | Voyer et al. | |

FOREIGN PATENT DOCUMENTS

| | | |
|---|---|---|
| JP | 11282804 | 10/1999 |
| JP | 2003196241 | 7/2003 |
| JP | 2004194098 | 7/2004 |
| JP | 2004310581 | 11/2004 |
| JP | 2005253018 | 9/2005 |
| JP | 2005286783 | 10/2005 |
| JP | 2006126916 | 5/2006 |
| JP | 2006279381 | 10/2006 |
| WO | 0030285 | 5/2000 |
| WO | 03102730 | 12/2003 |
| WO | 2004097590 | 11/2004 |
| WO | 2005013582 | 2/2005 |
| WO | 2005065038 | 7/2005 |
| WO | 2005065237 | 7/2005 |
| WO | 2005096160 | 10/2005 |
| WO | 2010151692 | 12/2010 |

OTHER PUBLICATIONS

Search Report and Written Opinion mailed Aug. 11, 2010 from International Serial No. PCT/US2010/039092 filed Jun. 17, 2010.

Search Report mailed Apr. 1, 2011 from European Patent Application No. 08834360.3 filed Sep. 29, 2008.

Search Report mailed Apr. 4, 2011 from European Patent Application No. 08833721.7 filed Sep. 29, 2008.

Search Report mailed Feb. 10, 2011 from European Patent Application No. 07837822.1 filed Sep. 6, 2007.

Search Report mailed Feb. 10, 2011 from European Patent Application No. 07837823.9 filed Sep. 6, 2007.

Search Report mailed Feb. 10, 2011 from European Patent Application No. 07837824.7 filed Sep. 6, 2007.

(56) References Cited

OTHER PUBLICATIONS

Search Report and Written Opinion mailed Apr. 26, 2012 from International Serial No. PCT/US2012/025121 filed Feb. 14, 2012.
Search Report and Written Opinion mailed Aug. 30, 2010 from International Serial No. PCT/US2010/039859 filed Jun. 24, 2010.
International Search Report and Written Opinion dated Aug. 30, 2010 for International Application No. PCT/US2010/039859, filed Jun. 24, 2010.
PCT International Search Report and Written Opinion dated Nov. 20, 2009 for International Application No. PCT/US2009/060532, 8 pages.
PCT International Search Report and Written Opinion dated Jul. 18, 2008 for International Application No. PCT/US2007/19464, 8 pages.
PCT International Search Report and Written Opinion dated Jun. 12, 2008 for International Application No. PCT/US2007/19462, 6 pages.
PCT International Search Report and Written Opinion dated May 21, 2008 for International Application No. PCT/US2007/19463, 7 pages.
PCT International Search Report and Written Opinion dated Dec. 3, 2008 for International Application No. PCT/US2008/78191, 7 pages.
PCT International Search Report and Written Opinion dated Dec. 8, 2008 for International Application No. PCT/US2008/78198, 10 pages.
Holtmanns et al., U.S. Appl. No. 60/818,517, filed Jul. 6, 2006, referenced in US 2008/0016230, 30 pages.
PCT International Search Report and Written Opinion dated Mar. 2, 2010 for International Application No. PCT/US2010/021409, 9 pages.
McCann, Stephen et al., "Novel WLAN Hotspot Authentication," Fifth IEE International Conference on 3G Mobile Communication Technologies, Oct. 18, 2004, pp. 59-63.
Search Report mailed Feb. 6, 2013 from European Patent Application No. 09821134.5 filed Oct. 13, 2009.
Anton, B. et al., "Best Current Practices for Wireless Internet Service Provider (WISP) Roaming," Wi-Fi Alliance, Feb. 2003.
Examination Report mailed May 13, 2013 from European Patent Application No. 08833721.7 filed Sep. 29, 2008.
Examination Report mailed May 13, 2013 from European Patent Application No. 08834360.3 filed Sep. 29, 2008.
Search Report mailed May 13, 2013 from European Application No. 10732222.4 filed Jan. 19, 2010.
Bauer, Kevin et al., "Mitigating Evil Twin Attacks in 802.11," IEEE Performance, Computing and Communications Conference (IPCCC 2008), Dec. 7, 2008, pp. 513-516.
Fukunaga, Yuji, "Application Management of Windows System Aimed One Step Higher: Wishing to Use Wirless Lan By and By," Monthly Network Magazine, ASCII Corporation, vol. 6, No. 6, pp. 152-155, Jun. 1, 2001.
Search Report mailed Oct. 14, 2013 from European Patent Application No. 10792679.2 filed Jun. 24, 2010.
Kurita, Hiroyuki et al., "Network Attachment Control Scheme for Onymous IP Terminals in Nomadic Services," IEICE Technical Report, vol. 107, No. 315, pp. 13-18, Nov. 8, 2007.
Rigney, C. et al., "Remote Authentication Dial in User Services (RADIUS)," The Internet Society, Network Working Group, Request for Comments 2865 (RFC 2865), Jun. 2000 [retrieved online at http://tools.ietf.org/search/rfc2865 on Feb. 12, 2014].

* cited by examiner

SYSTEMS AND METHODS FOR OBTAINING NETWORK CREDENTIALS

CROSS-REFERENCE TO RELATED APPLICATION

The present application claims benefit of U.S. Provisional Patent Application No. 61/220,073 filed Jun. 24, 2009, entitled "Systems and Methods for Network Selection" which is incorporated by reference. The present application is also related to U.S. Nonprovisional patent application Ser. No. 12/818,108, filed Jun. 17, 2010, entitled "Systems and Methods for Determining Location Over a Network," now U.S. Pat. No. 8,196,188, which is incorporated by reference.

The present application is a continuation-in-part of U.S. Nonprovisional patent application Ser. No. 12/240,920 filed Sep. 29, 2008, and entitled "Systems and Methods for Wireless Network Selection" which claims benefit of U.S. Provisional Patent Application No. 60/976,344 filed Sep. 28, 2007, and entitled "Systems and Methods for Opportunistic Access to Free and Open Wireless Networks" which are both incorporated herein by reference.

U.S. Nonprovisional patent application Ser. No. 12/240,920 is also a continuation-in-part of U.S. Nonprovisional patent application Ser. No. 11/899,739, filed Sep. 6, 2007 now U.S. Pat. No. 8,196,188, entitled "Systems and Methods for Providing Network Credentials" which claims benefit of U.S. Provisional Patent Application No. 60/824,756 filed Sep. 6, 2006, and entitled "Network Credential Discovery Using DNS," which are hereby incorporated by reference. U.S. Nonprovisional patent application Ser. No. 12/240,920 is also related to co-pending U.S. patent application Ser. No. 11/899,697, entitled "System and Method for Acquiring Network Credentials," filed Sep. 6, 2007, and co-pending U.S. patent application Ser. No. 11/899,638, entitled "Systems and Methods for Obtaining Network Access," filed Sep. 6, 2007, both of which are incorporated by reference.

BACKGROUND

1. Field of the Invention

The present invention generally relates to accessing networks. More particularly, the invention relates to obtaining network credentials to access a network.

2. Description of Related Art

The increasing use of the networks to access information has resulted in a greater dependence on network communication for a variety of activities. With this dependence comes the growing expectation that network access will be ubiquitous. Network access for mobile users has been particularly enhanced by improvements in wireless technology. Various cellular (e.g. GSM, CDMA and the like), Wi-Fi (i.e. IEEE 802.11), WiMAX (i.e. IEEE 802.16), and other technologies have enabled a wide range of access options for a potential network user. Many wireless access points or "hotspots" are accessible only with local geographic regions—in some cases as small as a specific business or other address. In addition, strategically placed hotspots may provide public or private network access for a diverse group of people.

The owners or managers of hotspots often require password and the like to enable user access. As a result, a user of multiple hotspots may have to store, remember, or otherwise manage a large number of passwords. Many users may store their passwords on a laptop computer they use to access the hotspot. However, not all devices capable of accessing hotspots are laptop computers; cellular phones, personal digital assistants (PDAs), and many other devices are now capable of wireless access. Unfortunately, users often cannot easily enter the password on the device or store the password within the device. For example, some devices capable of wireless access may not have a keyboard. Even when a device includes a keyboard, the keyboard is often small and may be of limited functionality, especially for users with limited finger dexterity.

When users store passwords on a laptop computer, the user must first access the laptop computer and store the correct password within the computer. When a password changes, the user is required to update the password within the computer. Additionally, having the username and password stored in the device presents a security problem should the device be lost or stolen.

Further, users are typically required to enter a password, username, and navigate a website to obtain network access. This process is time consuming and the user may enter the wrong information and be forced to re-enter data.

When users enter a password manually, they are less apt to remember difficult passwords. As a result, simple password access is susceptible to hacking and may compromise the user's network access, the hotspot, and/or the user's personal information. Moreover, the user's network access may be stolen if the user's simple password is hacked or simply guessed.

Connecting to wireless networks has traditionally been a complex process for users of wireless devices for other reasons. Typically, the user enters an area where two or more Wi-Fi networks are present, selects the Wi-Fi function on their laptop, and views a series of 'scan results' listing the available Wi-Fi networks. In one example, the listing of available Wi-Fi networks comprises a list of Wi-Fi network SSID identifiers. Users must often identify which Wi-Fi networks do not have encryption or other security mechanisms (e.g., a login page). To add to user frustration, some of the wireless networks may be functional while others may be misconfigured in such a way that renders the network unusable.

The user typically makes an arbitrary decision which Wi-Fi network to connect to based on the listing. In making a decision of which Wi-Fi network to connect, the user typically does not know whether the selected Wi-Fi network will provide adequate quality of service or even if the network will be able to provide an IP address via Dynamic Host Configuration Protocol (DHCP).

It is not uncommon for different network devices to share similar SSIDs or other identifiers. For example, the SSID of multiple public libraries may indicate "library." Since the SSIDs are not unique, it may be difficult to determine which network credentials to provide based only on the SSID in order to gain access. For example, one library with an SSID of "library" may allow access once a user indicates they are a "guest." Another library with the same SSID may require a library card identifier.

SUMMARY OF THE INVENTION

Exemplary methods and systems for providing network credentials for network access are described. The exemplary method comprises receiving a credential request from a digital device over a network device, identifying a network record based on at least some information within the credential request, retrieving a network credential from a plurality of network credentials based on the network record, and transmitting a credential request response containing the network credential from the plurality of network credentials to the digital device.

The method may further comprise decrypting the credential request, authenticating the credential request, and encrypting the credential request response. Further, the method may also comprise retrieving an encryption key based on the digital device. The credential request may be received over a standard protocol of the network device. The standard protocol may be DNS.

The credential request may comprise a location identifier. The method may further comprise receiving a confirmed access response from the digital device.

An exemplary system for providing network credentials may comprise a credential request module and a credential request response module. The credential request module may be configured to receive a credential request from a digital device over a network device. The credential request response module may be configured to identify a network record based on at least some information within the credential request, retrieve a network credential from a plurality of network credentials based on the network record, and transmit a credential request response containing the network to the digital device.

An exemplary computer readable medium may have embodied thereon a program. The program may be executable by a processor for performing a method for providing network credentials. The method may comprise receiving a credential request from a digital device over a network device, identifying a network record based on at least some information within the credential request, retrieving a network credential from a plurality of network credentials based on the network record, and transmitting a credential request response containing the network credential from the plurality of network credentials to the digital device.

Systems and methods for selecting a wireless network are disclosed. In some embodiments, a method comprises receiving a first network device identifier for a first network device and a second network device identifier for a second network device, obtaining a first network profile comprising a first attribute, the first network profile based on the first network device identifier, obtaining a second network profile comprising a second attribute, the second network profile based on the second network device identifier, and selecting either the first network device identifier or the second network device identifier based on an attribute analysis of the first attribute and the second attribute.

In various embodiments, the first network device identifier and the second network device identifier are received from a digital device by a server. The method may further comprise providing a wireless network selection based on the selection. The method may also further comprise providing a credential request response based on the selection.

In some embodiments, the network selection identifier comprises the first network device identifier. The network selection identifier may also comprise a sorted list including the first network device identifier and the second network device identifier wherein the list is sorted based on the attribute analysis of the first attribute and the second attribute. An attribute may comprise a performance metric, a shared indicator, and a service identifier.

The method may further comprise comparing the first attribute and the second attribute to minimum requirements wherein selecting either the first network identifier or the second network device identifier is also based, at least in part, on the comparison of the attributes to the minimum requirements. The method may also further comprise comparing the first attribute and the second attribute to personalized settings wherein selecting either the first network identifier or the second network device identifier is also based, at least in part, on the comparison of the attributes to personalized settings. The method may also further comprise receiving a user identifier and retrieving the personalized settings from a user account based on the user identifier.

In various embodiments, a system comprises a digital device and a server. The digital device may be coupled to a communication network and configured to transmit a first network device identifier for a first network device and a second network device identifier for a second network device over the communication network. The server may also be coupled to the communication network and configured to receive the first network device identifier and the second network device identifier from the digital device, to obtain a first network profile comprising a first attribute, the first network profile based on the first network device identifier, to obtain a second network profile comprising a second attribute, the second network profile based on the second network device identifier, and to select either the first network device identifier or the second network device identifier based on an attribute analysis of the first attribute and the second attribute.

A computer readable storage medium may be configured to store instructions, the instructions comprising a method, the method comprising the steps of receiving a first network device identifier for a first network device and a second network device identifier for a second network device, obtaining a first network profile comprising a first attribute, the first network profile based on the first network device identifier, obtaining a second network profile comprising a second attribute, the second network profile based on the second network device identifier, and selecting either the first network device identifier or the second network device identifier based on an attribute analysis of the first attribute and the second attribute.

Systems and methods for obtaining network credentials are disclosed. In some embodiments, a method comprises receiving, with a digital device, a network identifier from a network device, providing a first credential request including the network identifier to another digital device on a network, receiving a request for additional network information from the other digital device, providing a second credential request including additional network information to the other digital device, receiving a credential request response including network credentials from the other digital device, and providing the network credentials from the credential request response to a network device.

In some embodiments, the first credential request is formatted using DNS protocol. The first credential request may be provided to the other digital device via an open port on the network device. The open port may be port 53.

The network identifier may be any identifier that identifies the network, such as an SSID. The additional network information may be any information associated with the network including, but not limited to, a BSSID, a title to a web page received by the digital device from the network device, a URL of a web page received by the digital device from the network device, or a hash of a web page received by the digital device from the network device.

An exemplary system may comprise a request module and a response module. The request module may be configured to receive a network identifier from a network device. The response module may be configured to provide a first credential including the network identifier to another digital device on a network, receive a request for additional network information from the other digital device, provide a second credential request including additional network information to the other digital device, receive a credential request response including network credentials from the other digital device, and provide the network credentials from the credential request response to a network device.

An exemplary computer readable storage medium configured may be configured to store instructions. The instructions may comprise a method. The method may comprise the steps of receiving, with a digital device, a network identifier from a network device, providing a first credential request including the network identifier to another digital device on a network, receiving a request for additional network information from the other digital device, providing a second credential request including additional network information to the other digital device, receiving a credential request response including network credentials from the other digital device, and providing the network credentials from the credential request response to a network device.

DETAILED DESCRIPTION OF THE INVENTION

Embodiments of the present invention provide systems and methods for providing network credentials. In exemplary embodiments, a credential server receives a request for network credentials from a digital device at a hotspot. The request may be formatted as a standard protocol which is relayed from the hotspot to the credential server. The credential server may identify a network record based on at least some information contained within the request and transmit network credentials associated with the network record to the digital device. The digital device may receive the network credentials and provide them to network device in order to obtain network access.

In various embodiments, a rules server may identify a preferred network from a plurality of available networks that the digital device may connect based on a variety of network attributes. In one example, a digital device may scan a physical region for available networks and generate a list of available wireless networks. The list may be provided to a rules server which identifies and retrieves a network profile for each wireless network on the list. The rules server may then compare each network profile (e.g., via attributes contained within each profile) to select a preferred network from the list. The rules server may then transmit the wireless network selection to the digital device which may then access the network.

In some embodiments, the digital device accesses the selected wireless network using credentials provided by the credential server. In one example, when the rules server selects the preferred wireless network, the rules server (or another server in communication with the rules server) may simultaneously (or nearly simultaneously) provide a credential request response including network credentials associated with the selected wireless network.

Figure 1:
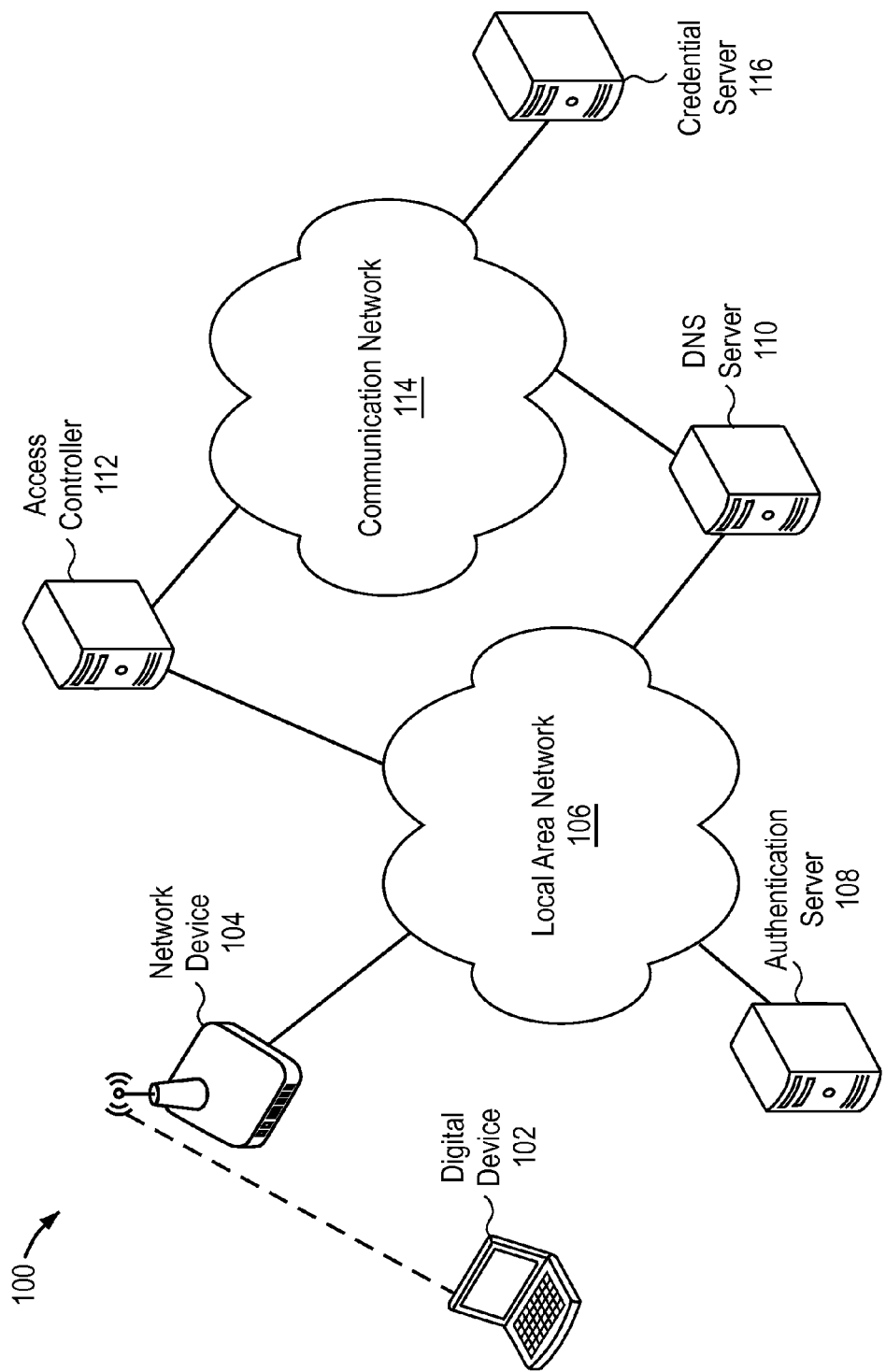
FIG. 1 is a diagram of an environment in which embodiments of the present invention may be practiced.

FIG. 1 illustrates a diagram of an environment 100 in which embodiments of the present invention may be practiced. In exemplary embodiments, a user with a digital device 102 enters a hotspot. The digital device 102 may automatically transmit a credential request as a standard protocol over a network device 104. The credential request may be forwarded to a credential server 116 which, based on the information contained within the credential request, transmits a credential request response back to the digital device 102. The credential request response contains network credentials which the digital device 102 may provide to the network device 104, the authentication server 108, or the access controller 112 to obtain access to the communication network 114.

In various embodiments, a hotspot comprises the network device 104, the authentication server 108, the DNS server 110, and the access controller 112 which are coupled to the local area network 106 (e.g., a "walled garden"). The network device 104 may comprise an access point which allows the digital device 102 to communicate with the authentication server 108, the DNS server 110, and the access controller 112 over the local area network 106. The digital device 102 may comprise a laptop, mobile phone, camera, personal digital assistant, or any other computing device. The authentication server 108 is a server that requires network credentials from the digital device 102 before allowing the digital device 102 access the communication network 114. The DNS server 110 provides DNS services over the local area network 106 and may relay requests to other DNS servers (not shown) across the communication network 114. The access controller 112 is an access device such as a router or bridge that can allow communication between devices operationally coupled to the network device 104 with devices coupled to the communication network 114.

Although the hotspot in FIG. 1 depicts separate servers coupled to the local area network 106, those skilled in the art will appreciate that there may be any number of devices (e.g., servers, digital devices, access controllers, and network devices) coupled to the local area network 106. In some embodiments, the local area network 106 is optional. In one example, the authentication server 108, the DNS server 110, and the access controller 112 are coupled directly to the network device 104. In various embodiments, the authentication server 108, the DNS server 110, and the access controller 112 may be combined within one or more servers or one or more digital devices. Further, although FIG. 1 depicts wireless access, the digital device 102 may be coupled to the network device 104 wirelessly or over wires (e.g., such as 10baseT).

In order to access the communication network 114, the authentication server 108 may require the digital device 102 to provide one or more network credentials for access to the hotspot. The network credential may comprise, for example, a username and password for an account associated with the hotspot. In alternative embodiments, network credentials other than a user name and password may be utilized.

According to exemplary embodiments, the digital device 102 may dynamically acquire the network credentials from the credential server 116. The digital device 102 may send a credential request comprising an identity of the digital device 102 (or the user of the digital device 102) and details about the network device 104 (e.g., name of the network device 104 or Wi-Fi service provider) to the credential server 116.

In one example, when the digital device 102 enters the hotspot, the network device 104 may provide an IP address to which DNS queries may be submitted, for example, via DHCP (Dynamic Host Configuration Protocol). The credential request may be formatted as a standard protocol. In an example, the credential request may be formatted as a DNS request. The credential request may be a text record request (e.g., TXT), which comprises a standard record type such that the network infrastructure (e.g., the access controller 112) will not block the request. More details regarding the process for acquiring network credentials are provided in co-pending U.S. patent application Ser. No. 11/899,697, entitled "System and Method for Acquiring Network Credentials," filed Sep. 6, 2007, and incorporated by reference herein.

In some embodiments, the credential request is received by the DNS server 110 which may forward the credential request to the credential server 116 for the network credential. In exemplary embodiments, the credential server 116 may perform a lookup to determine the proper network credential(s) to send back to the DNS server 110 which forwards the network credential back to the requesting digital device 102. In various embodiments, the proper network credential(s) are sent from the credential server 116 to the digital device 102 over the same path as the transmission of the credential request.

Although only one DNS server 110 is depicted within FIG. 1, the credential request may be forwarded through any number of servers, including but not limited to DNS servers, prior to being received by the credential server 116. In other embodiments, the credential request is forwarded directly from the network device 104 to the credential server 116.

In some embodiments, a credential request response from the credential server 116 may comprise the username, password, and/or login procedure information. The login procedural information may comprise, for example, HTML form element names, a submission URL, or a submission protocol. In some embodiments, the network credential response may be encrypted by the credential server 116 using an encryption key associated with the digital device 102 prior to transmission back to the digital device 102.

Once the digital device 102 receives the network credential response, the digital device 102 may submit the network credential (retrieved from the network credential response) to the network device 104 in an authentication response. In exemplary embodiments, the authentication response may be forwarded to an authentication server 108 for verification. In some embodiments, the authentication server 108 may comprise an AAA server or RADIUS server. More details regarding the process for obtaining network access are provided in co-pending U.S. patent application Ser. No. 11/899,638, entitled "System and Method for Obtaining Network Access," filed Sep. 6, 2007, and incorporated by reference herein.

It should be noted that FIG. 1 is exemplary. Alternative embodiments may comprise more, less, or functionally equivalent components and still be within the scope of present embodiments. For example, as previously discussed, the functions of the various servers (e.g., DNS server 110, credential server 116, and authentication server 108) may be combined into one or two servers. That if, for example, the authentication server 108 and the DNS server 110 may comprise the same server, or the functionality of the authentication server 108, the DNS server 110, and the access controller 112 may be combined into a single device.

Figure 2:
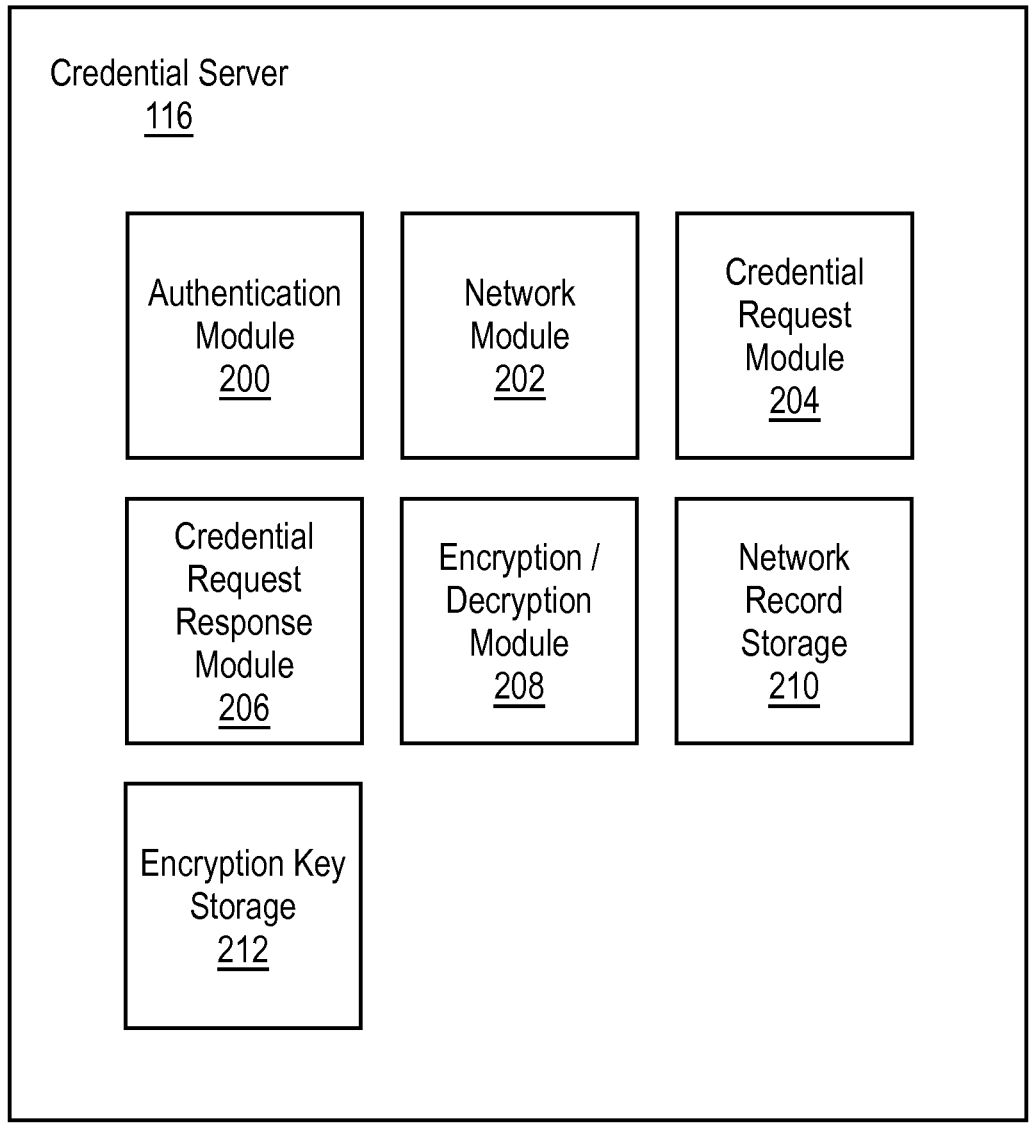
FIG. 2 is a block diagram of an exemplary credential server.

FIG. 2 is a block diagram of an exemplary credential server 116. The credential server 116 comprises an authentication module 200, a network module 202, a credential request module 204, a credential request response module 206, an encryption/decryption module 208, a network record storage 210, and an encryption key storage 212. A module may comprise, individually or in combination, software, hardware, firmware, or circuitry.

The authentication module 200 may be configured to authenticate the credential request and provide security to the credential request response. In various embodiments, the digital device 102 may encrypt or digitally sign the credential request using an encryption key (e.g., a shared encryption key or an encryption key that is a part of a key pair). The authentication module 200 may authenticate the credential request by decrypting the credential request with the proper encryption key retrieved from the encryption key storage 212. In one example, the digital device 102 generates a hash of the credential request and stores the hash within an encrypted portion of the credential request. The authentication module 200 may decrypt the credential request, generate hash of the credential request response, and compare the generated hash to the hash contained within the credential request for authentication.

In other embodiments, the digital device 102 may generate a nonce (i.e., a random value) and store the nonce within a portion of the credential request that is digitally signed. The authentication module 200 may decrypt the digital signature to authenticate the credential request and retrieve the nonce. In various embodiments, when the credential request response module 206 generates the credential request response (described hereafter), the authentication module 200 may include the nonce within the credential request response. The authentication module 200 or the encryption/decryption module 208 may then encrypt the credential request response. When the digital device 102 decrypts the credential request response, the digital device 102 may retrieve the nonce from the credential request response and compare the nonce to the nonce that was transmitted within the credential request for further authentication.

The network module 202 may be configured to receive the credential request and transmit the credential request response over the communication network 114.

The credential request module 204 may receive the credential request from the network module 202. The credential request may be a standard protocol. In one example, the credential request is a UDP protocol (e.g., DNS).

In exemplary embodiments, the credential request module 204 may retrieve the DDID and the SSID from the credential request. The DDID may identify the digital device 102, the user of the digital device 102, and/or the user associated with a network record. The SSID may identify the hotspot or the service provider (i.e., operator) of the hotspot.

The credential request module 204 or the credential request response module 206 may identify a network record based on the DDID and the SSID. A network record is a record associated (either directly or indirectly (e.g., a relational database)) with the DDID and the SSID. In one example, a network record contains network credentials necessary to provide network access to a digital device 102 associated with the DDID at the hotspot associated with the SSID. Network records may be stored within the network record storage 210.

The credential request response module 206 may generate the credential request response. In various embodiments, the credential request response module 206 receives the network credential associated with the DDID and SSID from the network record. In some embodiments, the network credential may comprise a credit card number. In one example, the digital device 102 receives the network credential, retrieves the credit card number, and provides the credit card number to the authentication server 108. In some examples, the authentication server 108 may then charge a fee to a credit card associated with the credit card number or use the information to confirm the identity of the user prior to granting network access.

Further, in various embodiments, the network credentials may comprise login procedural information. In one example, the credentials include a username and password which are to be provided within a form (e.g., an authentication form) retrieved from the authentication server 108 by the digital device 102. In some embodiments, the login procedural information may instruct the digital device 102 to populate specific fields within the form with the network credentials before submitting the completed form to the authentication server 108. Those skilled in the art will appreciate that there are many ways to provide credentials to the authentication server 108. The process of providing the credentials to the authentication server is further discussed in co-pending U.S. patent application Ser. No. 11/899,638, entitled "System and Method for Obtaining Network Credentials," filed Sep. 6, 2007.

The credential request response module 206 or the encryption/decryption module 208 may encrypt the credential request response with an encryption key associated with the DDID or the credential request. In one example, the credential server 116 stores one or more shared encryption keys. Each shared encryption key may be shared by at least one digital device 102. The credential request response module 206 may encrypt the credential request response with the shared encryption key associated with the digital device 102 (e.g., the shared encryption key may be associated with the DDID). The credential request response module 206 or the encryption/decryption module 208 may also encrypt the credential request with an encryption key that is part of a key pair. There may be many ways in which the encryption/decryption module 208 encrypts the credential request.

The encryption/decryption module 208 may decrypt the credential request and encrypt the credential request response. As previously discussed, the encryption/decryption module 208 may decrypt the digital signature of the credential request. In one example, the encryption/decryption module 208 decrypts the digital signature based on an encryption key that is associated with the DDID contained within the credential request. The encryption/decryption module 208 may also encrypt the credential request response. In one example, the encryption/decryption module 208 encrypts the credential request response based on an encryption key associated with the DDID (e.g., a shared encryption key or an encryption key that is part of a key pair).

In various embodiments, the encryption/decryption module 208 may encrypt the network records contained within the network record storage 210 and manage the encryption key storage 212. The encryption/decryption module 208 may also establish secure communications (e.g., via SSL and HTTPS) with a digital device when storing network credentials. This process is further described in FIG. 7. In accordance with some embodiments, the encryption/decryption module 208 may be optional.

The network record storage 210 and the encryption key storage 212 may store network records and encryption keys, respectively. The network record storage 210 and the encryption key storage 212 may comprise one or more databases. In one example, the network record storage 210 may store network records. A network record may comprise a DDID, SSID, and network credentials. The network record may also comprise a username and password for the user to access, alter, update, or store network records within the credential server 116.

In various embodiments, the network record may also allow multiple digital devices 102 to use the same network credentials. In one example, the user may own multiple digital devices 102. Multiple DDIDs, each DDID associated with a different digital device 102, may be included in the same network record. In some embodiments, multiple devices may be associated with one or more network records, and the one or more network records are associated with a user. As a result, the user may retrieve the network credentials for a hotspot using any number of digital devices 102. Those skilled in the art will appreciate that there are many ways in which the network records and/or the information contained therein may be stored and organized (e.g., different data structures, databases, records, organizing schemes, and/or methodologies).

Figure 3:
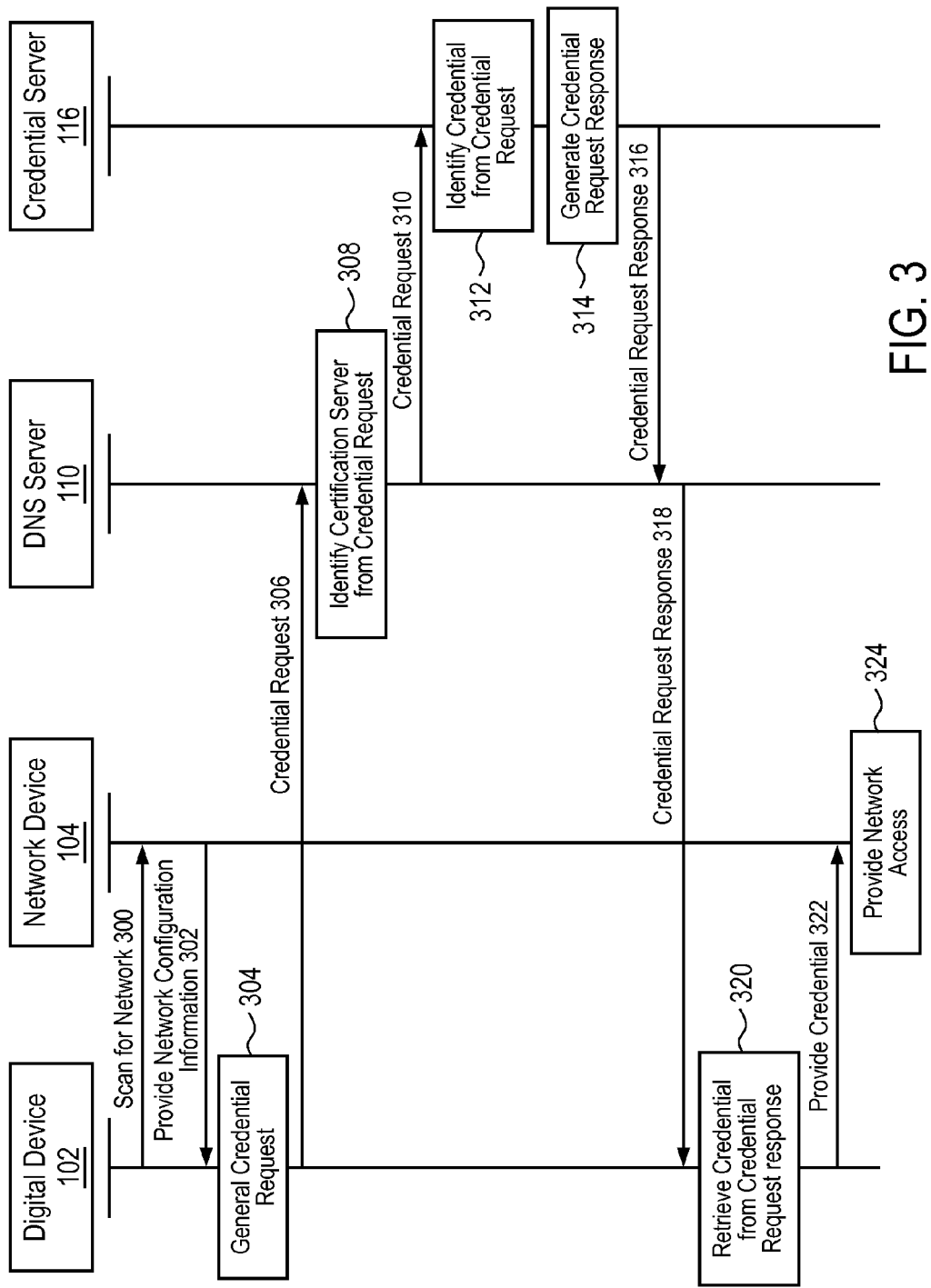
FIG. 3 is a flow diagram of an exemplary process for providing network access to the digital device.

FIG. 3 is a flow diagram of an exemplary process for providing network access to the digital device 102. When the digital device 102 first enters into a hotspot, the digital device 102 may scan for the local area network 106 in step 300. As a result of the scan, the network device 104 may provide network configuration information in step 302. The network configuration information may comprise one or more IP addresses for access to the DNS server 110.

In step 304, a credential request is generated by the digital device 102. Subsequently, the credential request may be sent to the DNS server 110 in step 306 using one of the IP addresses previously received from the network device 104.

Based on the credential request, the credential server 116 is identified by the DNS server 110 in step 308. In other embodiments, the DNS server 110 forwards the credential request to the credential server 116. When the DNS server 110 is unable to locally resolve the DNS request, the credential request is forwarded to another DNS server on the communication network 114 (e.g., over port 53) which may then forward the credential request to the credential server 116. The credential request is forwarded, either directly or indirectly through one or more other DNS servers on the communication network 114, to the credential server 116 in step 310.

The credential server 116 identifies the network credential needed based on the credential request in step 312. For example, the credential request may comprise an identifier (i.e., the DDID) for the digital device 102 as well as an identifier for the hotspot SSID (e.g., the service provider such as an operator). The identifiers may be compared against a table (e.g., network record) of such identifiers by the credential request module 204 or the credential request response module 206 to determine the proper network credential. A credential request response is then generated by the credential request response module 206 in step 314 and relayed back to the DNS server 110 in step 316. The DNS server 110 forwards the credential request response back to the digital device in step 318.

The digital device 102 may then retrieve the network credentials from the credential request response in step 320. The network credential may then be provided to the network device 104 in step 322. Upon verifying the network credentials, the network device 104 provides network access to the digital device 102 in step 324.

Figure 4:
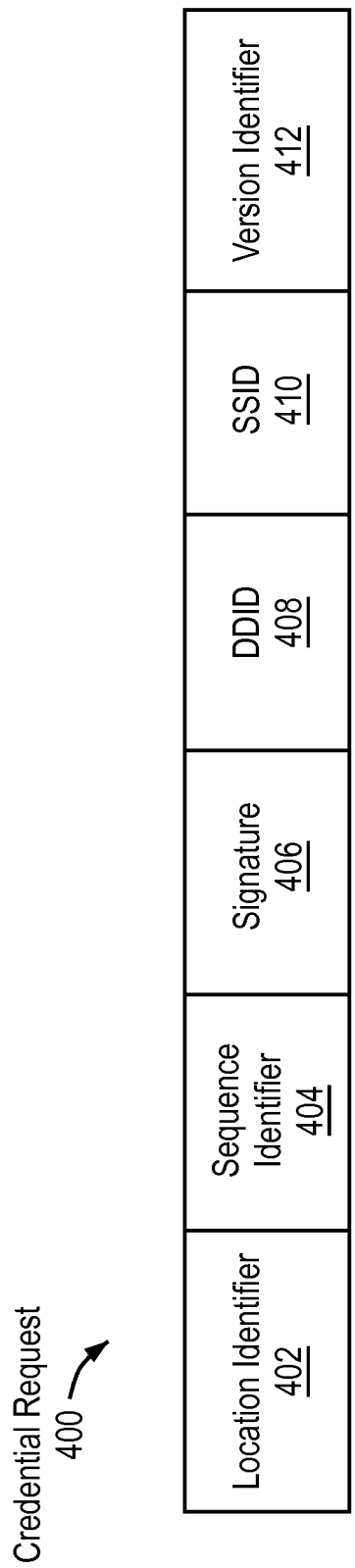
FIG. 4 is a block diagram of an exemplary credential request.

Referring now to FIG. 4, an exemplary credential request 400 is shown in more detail. According to exemplary embodiments, the credential request module 204 may generate the credential request 400. In one embodiment, the credential request 400 may be a DNS string having a structure that comprises a location identifier 402, a sequence identifier 404, a signature 406, the DDID 408, a service set identifier (SSID) 410, and a version identifier 412.

The optional location identifier 402 may indicate a physical or geographic location of the digital device 102, the network device 104, the authentication server 108, or the access controller 112. In various embodiments, the location identifier 402 may be used by the credential server 116 to track the usage of hotspots, users of the digital device 102, as well as the digital device 102.

The sequence identifier 404 may comprise any number or set of numbers used to correspond to a subsequent request to the credential server 116 to determine if the login is successful. That is, the sequence identifier 404 provides a correlation mechanism by which verification of the login process may be made by the credential server 116.

In exemplary embodiments, the signature 406 comprises a cryptographic signature (i.e., digital signature) that is utilized to prevent spoofing. The signature 406 of the request from digital device 102 is verified by the credential server 116. If the signature 406 is not valid, then the request is rejected by the credential server 116.

The DDID 408 comprises an identifier of the digital device 102. For example, the DDID 408 may comprise a MAC address or any other identifier of the digital device 102.

The SSID 410 comprises an identifier of the network access point or Wi-Fi service provider. For example, the SSID 410 may comprise the name of the service provider or the name of the venue operating the network device 104.

The version identifier 412 may identify the protocol or format of the credential request 400. For example, a digital device 102 may generate the credential request 400 and organize the data in a number of different formats. Each different format may be associated with a different version identifier. In some embodiments, the components of the credential request response module 206 may be updated, reconfigured, or altered over time, which may affect the structure of the credential request 400. As a result, the credential server 116 may receive a plurality of credential requests 400 which are formatted differently. The credential server 116 may access the required information from each credential request based on the respective version identifier.

Figure 5:
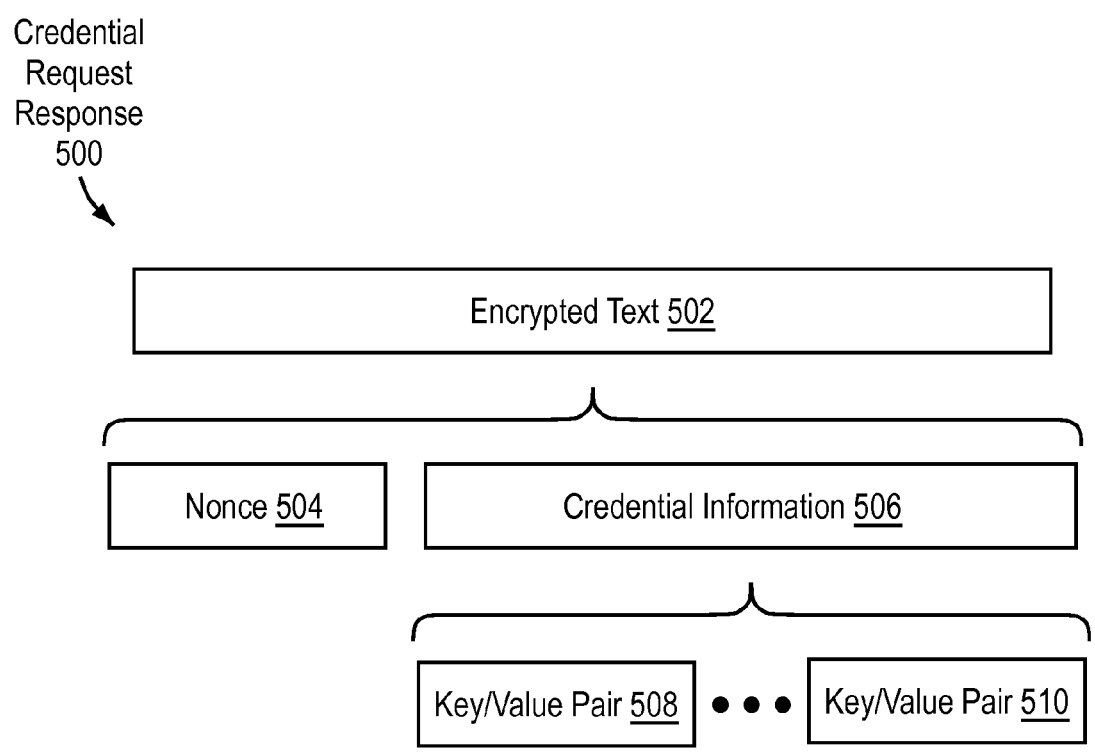
FIG. 5 is a block diagram of an exemplary credential request response.

FIG. 5 is a block diagram of an exemplary credential request response. According to exemplary embodiments, the credential request response module 206 may generate the credential request response 500. In one embodiment, the credential request response 500 may comprise encrypted text 502. The encrypted text may comprise an optional nonce 504 and credential information 506. The credential information may comprise key/value pairs 508 through 510.

As previously discussed, the credential request response may be formatted as a DNS response comprising encrypted text 502. The encrypted text 502 includes the network credentials (e.g., username, password, and login procedure information). Although the credential request response 500 is depicted as including encrypted text 502, the text within the credential request response 500 need not be encrypted.

The encrypted text 502 may comprise the nonce. The nonce, as previously discussed, may be retrieved from the credential request. Once the credential request response 500 is received by the digital device 102, the digital device 102 may compare the nonce within the credential request response 500 to the nonce transmitted within the credential request for authentication. Although the nonce is depicted as within the credential request response 500 in FIG. 5, the nonce is optional.

The credential information 506 may comprise a username, password, login procedure information, or a combination of these. The credential information 506 may comprise key/value pairs 508 through 510. Any number of key/value pairs may be within the credential information 506. The key/value pairs may represent the credential information to be received and translated by the digital device 102. The credential information 506 is depicted as key/value pairs for exemplary purposes only; the credential information may be within any format not necessarily limited to key/value pairs.

Figure 6:
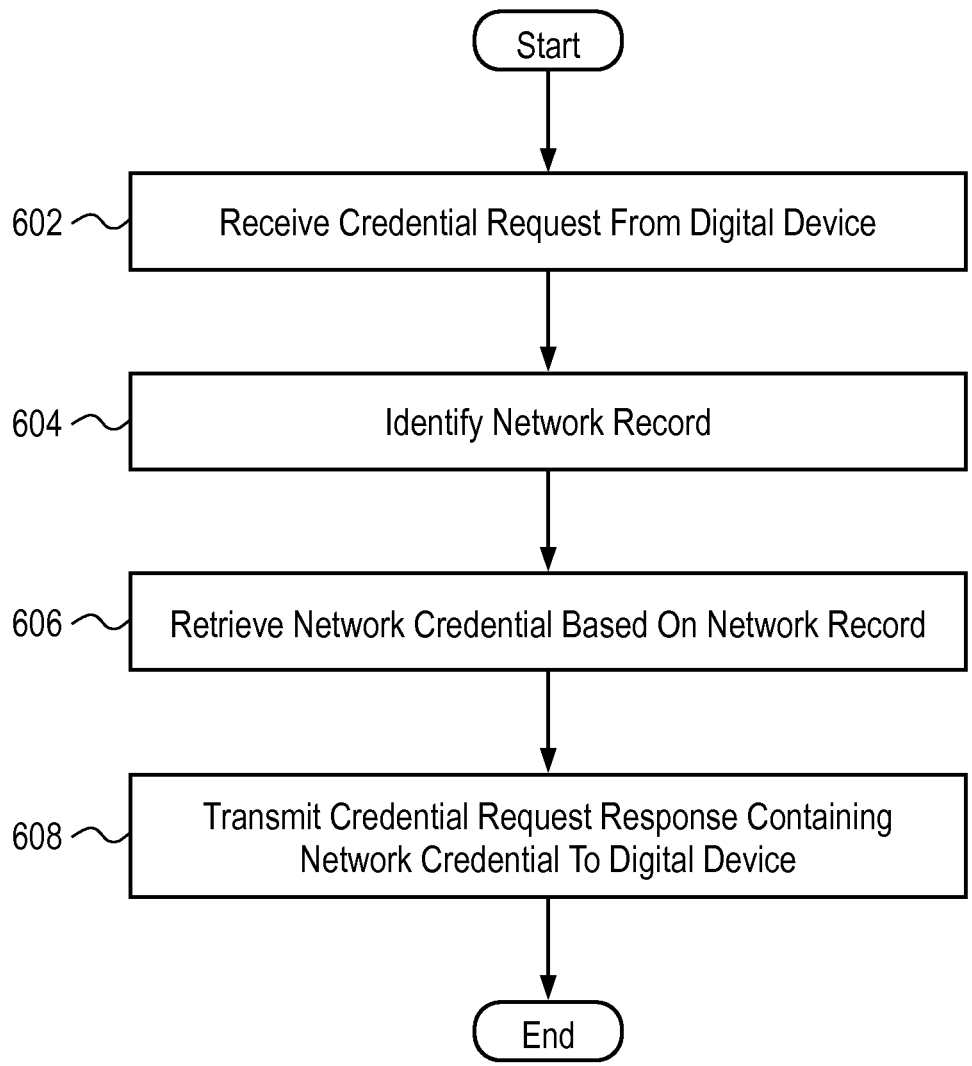
FIG. 6 is a flow diagram of the exemplary method for providing network credentials.

FIG. 6 is a flow diagram of the exemplary method for providing network credentials. In step 602, the credential server 116 receives the credential request from the digital device 102.

In various embodiments, the credential server 116 decrypts and authenticates the digital signature with an encryption key. The credential server 116 may then identify a network record based on the DDID and the SSID contained within the network record in step 604. In one example, the credential request response module 206 retrieves one or more network records associated with the DDID within the credential request. The credential request response module 206 then identifies at least one network credential associated with the SSID within the retrieved network record(s).

In step 606, the credential request response module 206 retrieves the identified network credential(s) from the selected network record. In one example, the credential request response module 206 identifies a username and password that the user of the digital device 102 must provide to the authentication server 108 to obtain network access. The credential request response module 206 generates the credential request response comprising the network credentials (e.g., username, password) to the digital device 102 in step 608.

In some embodiments, the credential request response module 206 may identify login procedural information as part of the network credentials. The credential request response module 206 may retrieve the login procedural information from the network record (e.g., the same network record containing a password associated with the SSID). The login procedural information may contain a form identifier and instructions (e.g., parameters) for the digital device 102 to follow to obtain network access. In one example, the digital device 102 retrieves the form identifier and instructions from the network credential within the credential request response. The digital device 102 may identify forms received from the authentication server 108 and input data based on the form identifier and instructions. In another example, the digital device 102 provides information to the authentication server 108 to obtain network access based on the login procedural information included within the credential request response. The process of providing information to the authentication server 108 is further described in U.S. patent application Ser. No. 11/899,638 entitled "Systems and Methods for Obtaining Network Access", filed Sep. 6, 2007.

Figure 7:
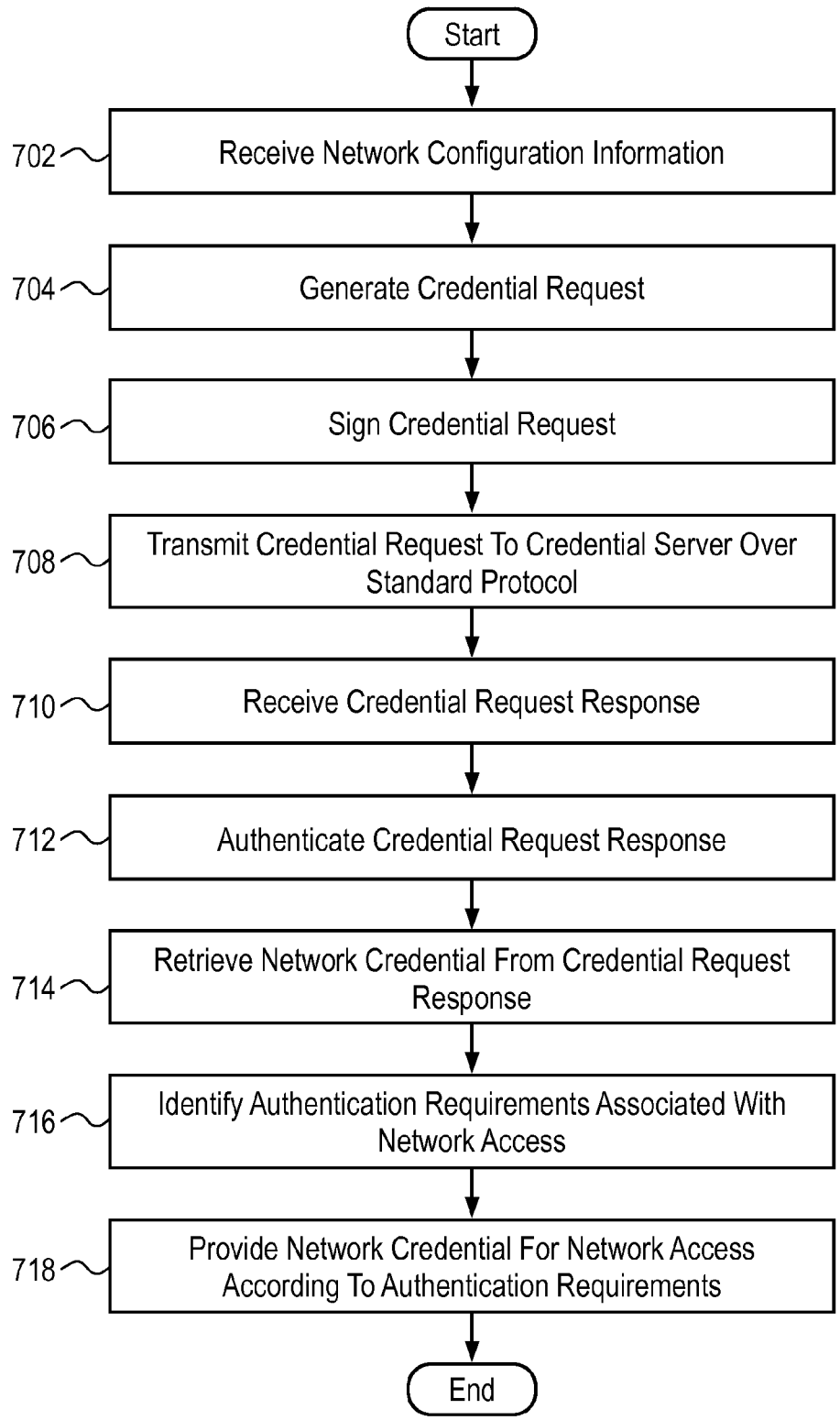
FIG. 7 is another flow diagram of the exemplary method for providing network credentials.

FIG. 7 is another flow diagram of the exemplary method for providing network credentials. The digital device 102 may search and find an available wireless network via the network device 104. While connecting to the hotspot, the digital device 102 may receive network configuration information in step 702. Network configuration information may comprise an identifier for the network device 104, or the DNS server 110. In one example, the digital device 102 receives a DNS server IP address (e.g., for the DNS server 110) during the connection process.

In step 704, the digital device 102 generates the credential request. The credential request may comprise a sequence identifier, DDID, and SSID. In step 706, the digital device 102 optionally generates a nonce and digitally signs the credential request with an encryption key. The digital device 102 transmits the credential request as a standard protocol in step 708. The network device 104 may receive and forward the credential request to the communication network 114. In various embodiments, the network device 104 may provide the credential request to the DNS server 110 which may forward the credential request to the credential server 116.

In exemplary embodiments, the credential request module 204 of the credential server 116 receives the credential request. The credential request module 204 may retrieve an encryption key associated with the DDID within the credential server from the encryption key storage 212. The credential request module 204 may then decrypt the digital signature of the credential request for authentication. The credential request module 204 may further retrieve the nonce and a sequence identifier from the credential request.

The credential request response module 206 of the credential server 116 may then retrieve a network record associated with the DDID and the SSID from the network record storage 210. The credential request response module 206 retrieves network credentials from the network record and generates the credential request response. The credential request response may comprise the network credentials and the nonce. The encryption/decryption module 208 may encrypt the credential request response with an encryption key associated with the DDID retrieved from the encryption key storage 212. In some embodiments, the credential request response is formatted as a standard protocol (e.g., DNS).

In step 710, the digital device 102 receives the credential request response. The digital device 102 subsequently authenticates the credential request response in step 712. In one example, the digital device 102 decrypts the credential request response with the same encryption key used to digitally sign the credential request. The digital device 102 may further retrieve the nonce within the credential request response and compare the nonce to the nonce transmitted within the credential request for further authentication. If the credential request response is found to be authentic, the digital device 102 retrieves the network credentials from the credential request response in step 714.

In step 716, the digital device 102 identifies the authentication requirements associated with network access. In various embodiments, the digital device 102 determines the correct information and network credentials to provide to the authentication server 108. In one example, the digital device 102 retrieves one or more network access pages from the authentication server 108. The digital device 102 may access the correct network access page from the authentication server and automatically make selections. In one example, the digital device 102 may automatically activate selections (e.g., activate buttons within the network access page, check boxes, and select radio buttons).

For example, the credential request response module 206 may provide instructions to the digital device 102 for the automatic selections within a network access page. As discussed herein, a network access page may comprise one or more web pages, one or more tags, or a combination of both retrieved from the authentication server 108. In one example, software within the digital device 102 may automatically check all selection boxes within a network access page. The digital device 102 may then uncheck select boxes based on the login procedure information. Those skilled in the art will appreciate that there may be many methods with which selections may automatically be made. In other embodiments, the digital device 102 receives XML tags from the authentication server 108. The digital device 102 may provide information based on the XML tags and instructions within the login procedural information to the authentication server 108 to obtain network access.

In step 718, the digital device 102 provides the network credential to the network device 104 to obtain network access to the communication network 114. In one example, the credential request response module 206 retrieves one or more forms from the authentication server 108, populates the forms with one or more network credentials, and provides the completed forms to the authentication server 108. In another example, the credential request response module 206 provides the network credentials as needed to the authentication server 108. Once the network credentials are received by the authentication server 108, the authentication server 108 may allow communication between the digital device 102 and the communication network 114. In one example, the authentication server 108 commands the access controller 112 to allow the digital device 102 access to the communication network 114.

The digital device 102 may subsequently test network connectivity to confirm network access. In one example, the digital device 102 transmits a request to the credential server 116 to determine if the communication network 114 is available. In some embodiments, the query or command contains the sequence identifier previously submitted within the credential request. If network access is successful, the credential server 116 may receive the request and retrieve the sequence identifier. The credential server 116 may then confirm that network access was successful.

Figure 8:
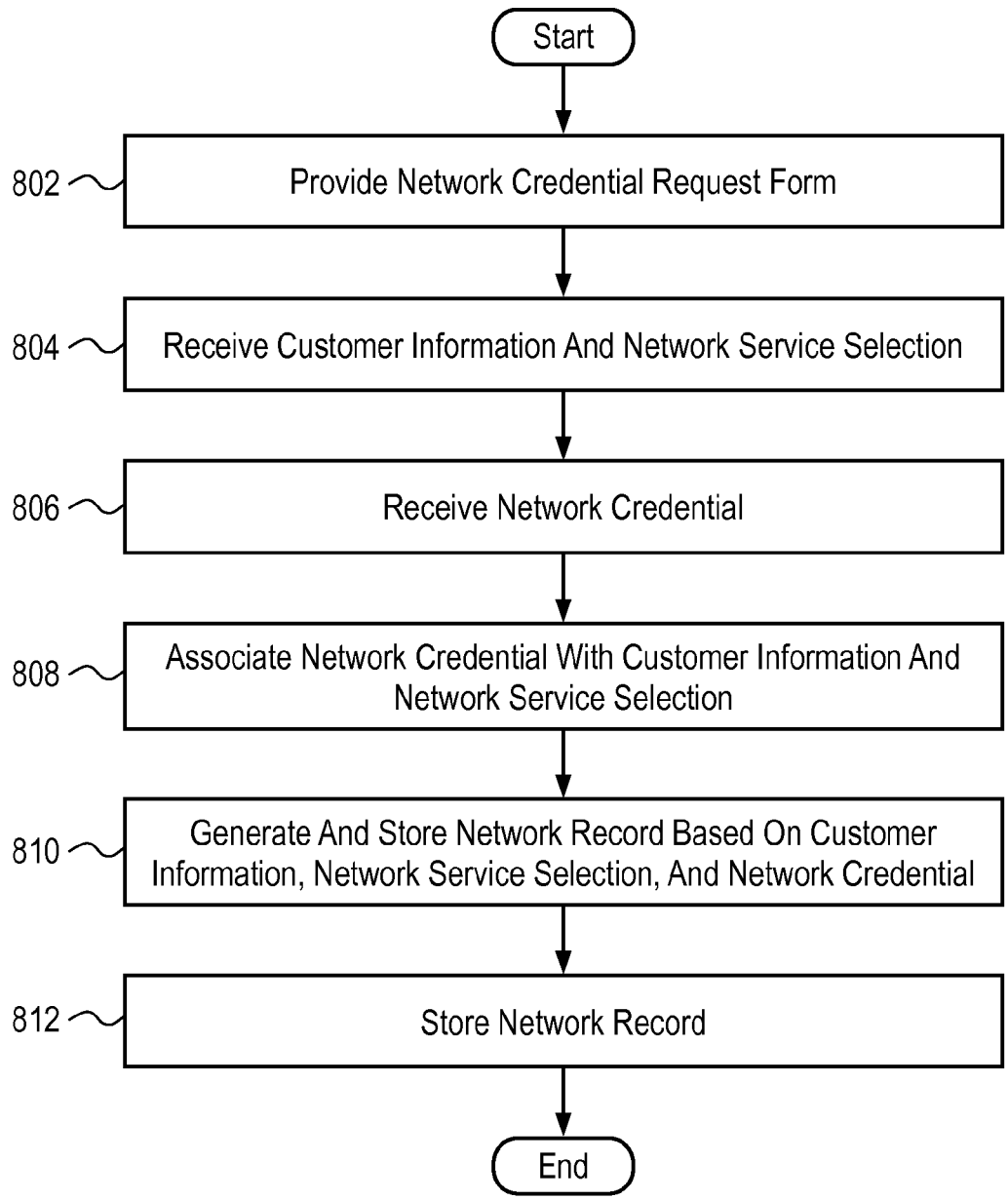
FIG. 8 is a flow diagram of an exemplary method for receiving and storing network credentials.

FIG. 8 is a flow diagram of an exemplary method for receiving and storing network credentials. In various embodiments, users may create and store network records within the credential server 116. For example, the credential server 116 may comprise a credential storage module (not depicted) that provides a graphical user interface (GUI) that allows users to create, store, update, remove, and modify network records.

In step 802, the credential server 116 provides the user with a network credential request form. In one example, the credential server 116 provides the network credential request form to a user as one or more web pages over the Internet. The network credential request form is configured to receive the service provider's name (e.g., operator's name) and/or SSID and network credentials.

The service provider's name may comprise the name of the entity that operates the hotspot, one or more components related to the hotspot (e.g., the network device 104), or the infrastructure of the local area network 106. In some embodiments, the service provider's name comprises the name of an organization that manages one or more hotspots for another service provider. In one example, a coffee shop and bookstore may both use a third-party manager to manage the hotspots, even if the hotspots have different service providers. In some embodiments, the network credential request form may be configured to receive the third-party manager's name. In some embodiments, the service provider's name comprises the name of an organization that resells access to a hotspot network (e.g., an aggregator).

The network credential request form may also receive the SSID as a network service selection. In one example, the network credential request form comprises a pull down menu of different service providers and/or hotspots that the user may select. For example, a user may select "Starbucks" or "San Francisco International Airport" as a hotspot. The user may be given further options to such as geographic locations of the hotspot. The user may also select the service provider. For example, the user may select "T-Mobile" as a service provider. The network credential request form may then allow the user to select among one or more various hotspots associated with T-mobile. The selection(s) may then be stored as a network record. Alternately, a network service identifier associated with the selection(s) is generated as the SSID.

Further, the network credential request form may receive the network credential from the user. For example, the user may enter a username, password, passcode as network credentials within the network credential request form. In some embodiments, after the network credential request form receives the SSID, the network credential request form determines the type of network credentials required. For example, the network credential request form identifies the information required to access a network at a hotspot at the San Francisco International Airport previously selected by the user. The network credential request form then generates fields or selections to allow the user to enter only the information necessary (e.g., username, password) to obtain network access at the hotspot.

The credential server 116 may also require the user to register prior to receiving the network credential request form. During registration, the user may be required to agree to terms of service and enter customer information. Customer information comprises a username and a password to access the credential server 116 to store network credentials. Optionally, the customer information may comprise the user's address, contact information, and payment options for the user to use services offered by the credential server 116.

In step 804, the credential server 116 receives the customer information and network service selections over the network credential request form. In step 806, the credential server may retrieve the network credential. In step 808 the credential server 116 receives the customer information. The credential server 116 associates the network credential with the customer information, network service selection and network credential(s) in step 810 to create a network record. The network record is then stored in step 812.

In some embodiments, the user may manually access the credential server 116 via the Internet. In other embodiments, the user may download and install network credential software on the digital device 102. The network credential software may identify and send the DDID of the digital device 102 to the credential server 116. In other embodiments, the network credential software may be pre-installed on the digital device 102. When the digital device 102 first activates the network credential software, the network credential software may identify and send the DDID of the digital device 102 to the credential server.

The user may input the SSID (e.g., identify the service provider or hotspots) into the network credential software. The user may also input the network credentials within the network credential software. After the network credential software has obtained the DDID, SSID, and network credentials, the network credential software may upload the information to the credential server 116 which stores the information within a network record. In various embodiments, the network credential software may be downloaded from the credential server 116.

Figure 9:
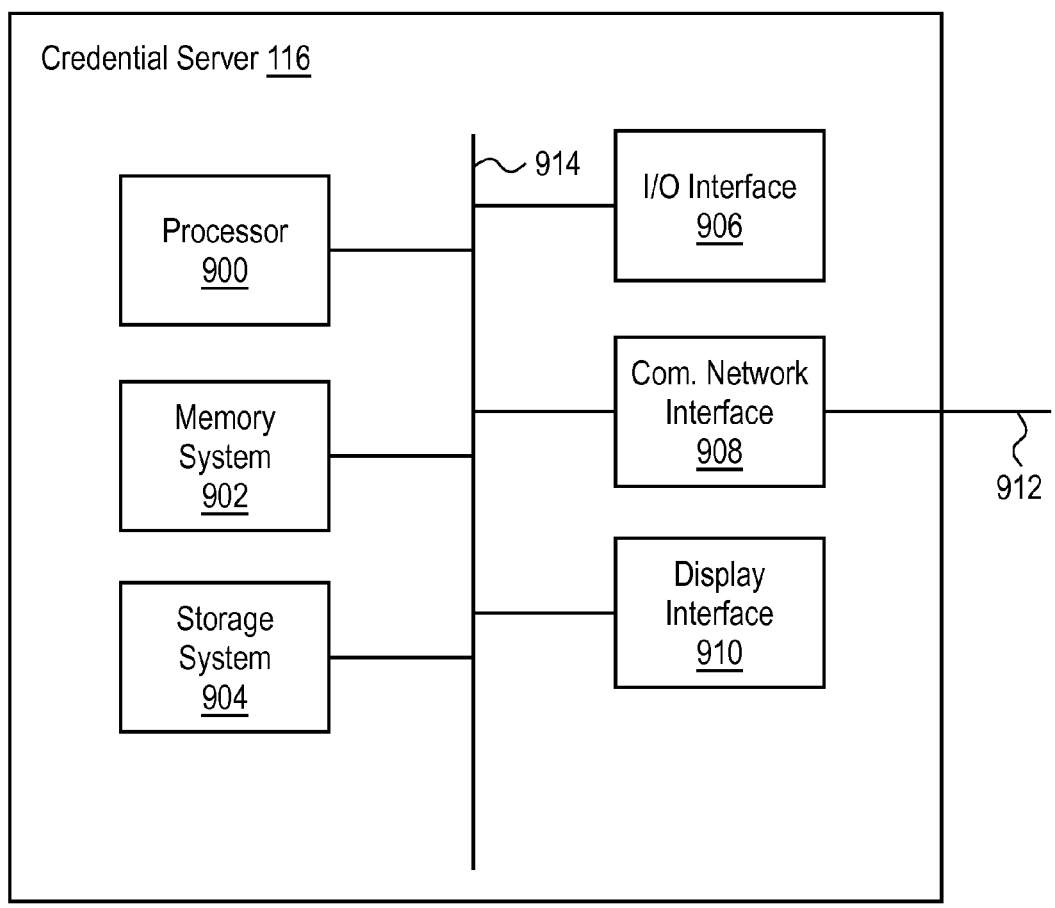
FIG. 9 is a block diagram of an exemplary credential server.

FIG. 9 is a block diagram of an exemplary digital device. The credential server 116 comprises a processor 900, a memory system 902, a storage system 904, an I/O interface 906, a communication network interface 908, and a display interface 910. The processor 900 is configured to execute executable instructions (e.g., programs). In some embodiments, the processor 900 comprises circuitry or any processor capable of processing the executable instructions.

The memory system 902 is any memory configured to store data. Some examples of the memory system 902 are storage devices, such as RAM or ROM. The memory system 902 can comprise the ram cache. In various embodiments, data is stored within the memory system 902. The data within the memory system 902 may be cleared or ultimately transferred to the storage system 904.

The storage system 904 is any storage configured to retrieve and store data. Some examples of the storage system 904 are flash drives, hard drives, optical drives, and/or magnetic tape. In some embodiments, the credential server 116 includes a memory system 902 in the form of RAM and a storage system 904 in the form of flash data. Both the memory system 902 and the storage system 904 comprise computer readable media which may store instructions or programs that are executable by a computer processor including the processor 900.

The optional input/output (I/O) interface 906 is any device that receives input from the user and output data. The optional display interface 910 is any device that is configured to output graphics and data to a display. In one example, the display interface 910 is a graphics adapter. It will be appreciated that not all digital devices 102 comprise either the I/O interface 906 or the display interface 910.

The communication network interface (com. network interface) 908 can be coupled to a network (e.g., the local area network 106 and communication network 114) via the link 912. The communication network interface 908 may support communication over an Ethernet connection, a serial connection, a parallel connection, or an ATA connection, for example. The communication network interface 908 may also support wireless communication (e.g., 802.11 a/b/g/n, WiMax). It will be apparent to those skilled in the art that the communication network interface 908 can support many wired and wireless standards.

In various embodiments, systems and methods are described that enable a digital device to automatically select and access an available wireless network from a plurality of available wireless networks based on rules to achieve a satisfactory quality of service. Such rules could be implemented in the digital device itself, on a server in communication with the digital device, or a combination of both. In various embodiments, a wireless network is a network that allows wireless access between a digital device and a communication network such as the Internet.

In accordance with some embodiments, a user of a wireless digital device (e.g., digital device capable of Wi-Fi communication) creates an account on a web server and registers one or more digital devices (e.g., computers, laptops, personal digital assistants, and cell phones) with that account. The registered digital devices can be managed and a network record provisioned by a central server (e.g., a profile server or a credential server) via a network communication mechanism, such as HTTP.

Figure 10:
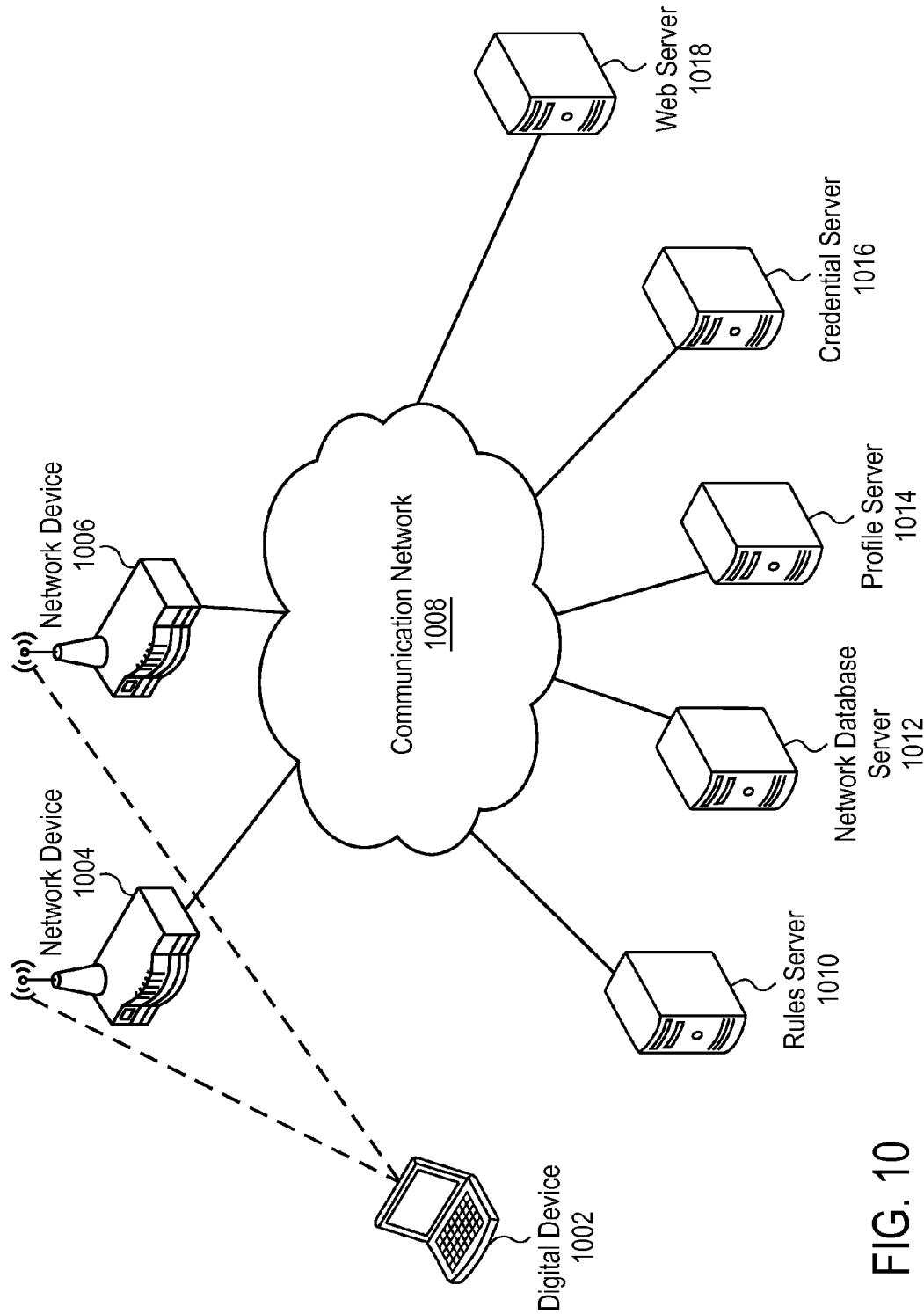
FIG. 10 is a diagram of another environment in which embodiments of the present invention may be practiced.

FIG. 10 is a diagram of another environment in which embodiments of the present invention may be practiced. In various embodiments, a user with a digital device 1002 enters an area located near the network devices 1004 and 1006. In one example, the network devices 1004 and 1006 are separate access points which may each be used to establish communication between the digital device 1002 and the communication network 1008.

The digital device 1002 may scan the area surrounding the digital device 1002, detect the two network devices 1004 and 1006, and generate a list of available wireless networks with which the digital device 1002 may establish communication. In some embodiments, the list of available wireless networks comprises DDID, SSID, and/or BSSID identifiers of the network devices 1004 and 1006.

Subsequently, the digital device 1002 provides the list of available wireless networks to a rules server 1010. In one example, the digital device 1002 provides the list of available wireless networks as a standard protocol over an open port of either the network device 1004 or the network device 1006 to the communication network 1008 and, ultimately, to the rules server 1010. In another example, the digital device 1002 provides the list of available wireless networks over another network such as a cellular communication network (e.g., via CDMA, GSM, 3G, or EVDO) or other wireless network (e.g., Wi-Fi, Wimax, or LTE network) not depicted.

The rules server 1010 receives the list of available wireless networks and may retrieve a network profile for each wireless network identified within the list. A network profile is a record that is associated with a wireless network and comprises attributes concerning performance and/or quality of service provided by the associated network. In one example, the rules server 1010 identifies each network within the list and provides the SSID and/or BSSID for each network to the profile server 1014. The profile server 1014 may then provide a network profile (based on the SSID and/or BSSID) for each network to the rules server 1010. In some embodiments, the profile server 1014 retrieves the network profile from a database or other server (e.g., network database server 1012).

The rules server 1010 may select a preferred wireless network from the list of available wireless networks based on attributes within the network profiles and/or any attributes received from the digital device 1002. An attribute is a characteristic of a wireless network. In various embodiments, an attribute includes a performance metric, a shared indicator, or a service identifier. A performance metric of a wireless network is any measure of network performance. In some examples, a performance metric may comprise a latency metric, a bandwidth metric, or a quality of service (QOS) metric. Those skilled in the art will appreciate that a performance metric may include any type of metric that represents performance of a wireless network.

A latency metric is a measurement that represents time to send a packet of data from the digital device to a server on a network. In some embodiments, the digital device 1002 may send an ICMP "echo request" packet to a server and listen for an ICMP "echo response" reply. The latency metric may comprise an estimate of the round-trip time (generally in milliseconds) and/or include any packet loss. In another example, the latency metric is half of the estimated round-trip time.

A bandwidth metric is a measurement of the available bandwidth of a wireless network. In one example, the digital device may test available bandwidth by sending a block of data over the wireless network to a server and timing the response.

A QOS metric is any metric that measures the quality of service of the wireless network, the access device 1004, the access device 1006, and/or the communication network 1008. In one example, the QOS metric represents a reliability of the DHCP which is determined by timing the length of time required to get an IP address. The reliability of the DHCP may comprise a statistical measurement, a probability of receiving an IP address at all, and/or a distribution of time.

A shared indicator indicates if a wireless network is shared. In some embodiments, the shared indicator may be one of three states including "shared," "not shared," and "unknown". Although the shared indicator may only include a single state (e.g., "not shared"), those skilled in the art will appreciate that the shared indicator can have any number of states. A wireless network with a shared indicator that indicates that the network is "shared" may indicate that the owner of the wireless network intends for others to use the network. One example of a "shared" network may include a wireless network which is intentionally "open" (e.g., unencrypted) for others to use.

A wireless network with a shared indicator that indicates that the network is "not shared" may indicate that the owner of the wireless network does not desire anyone who does not have express permission to access the network. In one example, wireless networks that are not shared are often intentionally encrypted (e.g., through WEP or WPA) so as to limit access to unauthorized users. Not all networks that are "not shared," however, are encrypted. For example, the owner of the network may misconfigure the network device or, through error, allows a network to be open (i.e., unencrypted) even though the network is not intended to be shared.

A wireless network with a shared indicator that indicates that the network is "unknown" may indicate that the wireless network may either be "shared' or "not shared." For example, the intent of the owner of an open network may not be known.

A service identifier may identify one or more services supported by the wireless network. In one example, one or more service identifiers indicate that a wireless network supports VOIP, teleconferencing, and/or video conferencing. The service identifier may identify any kind of service supported by the wireless network. In some embodiments, the service identifier may identify services that are not supported by the wireless network.

Those skilled in the art will appreciate that the network profile may comprise any number of attributes. Further, those skilled in the art will appreciate that the network profile may comprise only one or more performance metrics, only one shared indicator, or only one or more service identifiers.

In various embodiments, the rules server 1010 selects one or more wireless networks from the list of available wireless networks based on the attribute analysis. In one example, the rules server 1010 applies rules to the attributes. The rules may comprise minimum requirements, personalized settings, and attribute comparisons. In one example, the rules applied by the rules server 1010 may compare the attributes of one or more wireless networks to one or more minimum requirements. If the attributes for a wireless network are below the minimum requirements, then the wireless network may not be selected or removed from the list of available wireless networks.

In some embodiments, the rules applied by the rules server 1010 may be based on personalized settings by the user. For example, the user of the digital device 1002 may indicate personalized settings that indicate that the digital device 1002 is only to connect over wireless networks that have been designated as "shared." In this example, the rules server 1010 may select only those wireless networks with an attribute that comprises a shared indicator that identifies the wireless network as "shared."

In various embodiments, the rules applied by the rules server 1010 may be based on a comparison of the attributes of one wireless network to another. In one example, the attributes may indicate that one wireless network has a greater bandwidth and shorter latency than another. In this example, the rules server 1010 may select one wireless network that has better performance or valuable services in comparison to another. Those skilled in the art will appreciate that there may be any kind of rule used to select or to assist in the selection of a wireless network from the list of available wireless networks.

More than one rule may be applied by the rules server 1010 in making the wireless network selection. In one example, the rules server 1010 may apply personalized settings of the user before comparing attributes from different wireless networks and making a selection. In another example, the rules server 1010 may apply minimum requirements to the attributes before comparing the attributes.

Once the rules server 1010 selects the wireless network based on the comparison of attributes from the network profiles, the rules server 1010 may provide the wireless network selection to the digital device 1002. A wireless network selection includes one or more identifiers (e.g., network identifiers) that identify at least one wireless network. The wireless network selection may identify a single wireless network or comprise a sorted list of wireless networks which is sorted in order of preference.

In some embodiments, the rules server 1010 provides credentials (e.g., a credential request response) for the selected wireless network in addition to the wireless network selection to the digital device 1002. In one example, the rules server 1010 provides the selected wireless network to the credential server 1016 which then provides a credential request response (even though no credential request has been made) for the selected wireless network to the digital device 1002. In other embodiments, the digital device 1002 receives the wireless network selection and then proceeds to transmit a credential request to the credential server 1016 to receive the credentials as discussed herein.

Further, in various embodiments, the digital device 1002 attempts to establish a connection based on the selected wireless network. If the connection fails, the digital device 1002 may transmit a credential request to the credential server 1016 to retrieve credentials for network access as described herein. The digital device 1002 may provide the credential request to the credential server 1016 over an open port of the network device 1004. In another example, the digital device 1002 may provide a credential request over any other network including a connection with a different network device or over a cellular connection.

Although the rules server 1010, network database server 1012, profile server 1014, the credential server 1016, and the web server 1018 are depicted as separate servers in FIG. 1, the servers may all be combined as one or more servers. Similarly, the functions of any of the servers may be performed by one of the other servers depicted or any other server.

Although FIG. 10 depicts multiple servers (e.g., rules server, network database server, profile server, credential server, and web server) for performing the selection of a wireless network from the plurality of available wireless networks, it will be appreciated by those skilled in the art that the selection of the wireless networks may occur within the digital device 1002. In one example, the digital device 1002 retrieves the scan results listing available wireless networks and selects a wireless network based on configuration preferences. The configuration preferences may be based on one or more locally executed rules, preferred signal strength, or any other attribute or attributes. In another example, the digital device 1002 selects a wireless network that supports a desired service (e.g., VOIP), meets a minimum latency standard, and meets a minimum QOS standard. In another example, the profile server 1014 provides the desired network profiles to the digital device 1002 which performs the analysis to determine the preferred wireless network.

Figure 11:
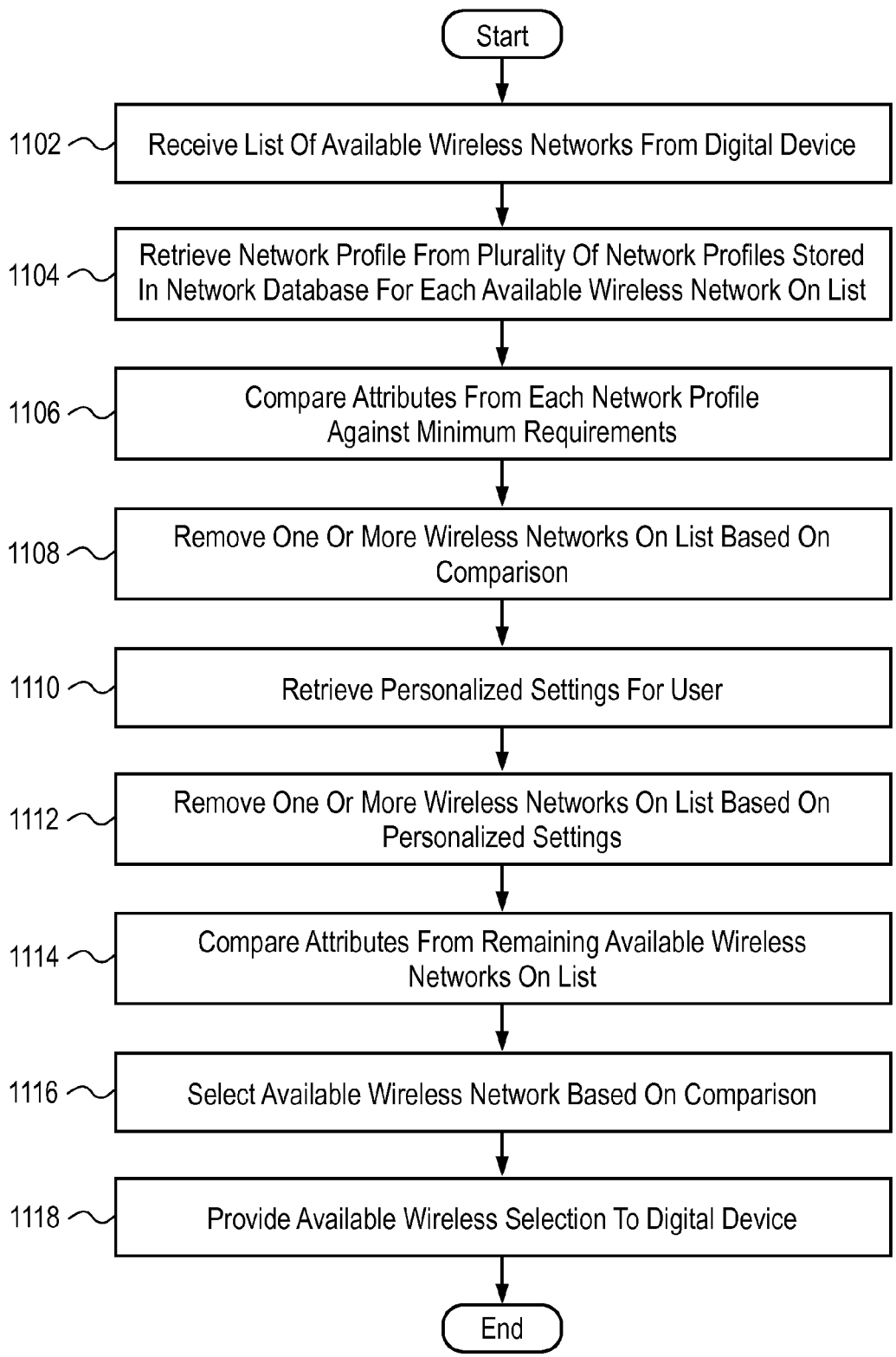
FIG. 11 is a flow diagram of an exemplary process for providing a selection of a wireless network.

FIG. 11 is a flow diagram of an exemplary process for providing a selection of a wireless network. In step 1102, a server (e.g., rules server 1010, network database server 1012, profile server 1014, credential server 1016, or web server 1018) receives a list of available wireless networks from the digital device 1002. In some examples, the list comprises the SSIDs or BSSIDs of one or more network devices (e.g., network device 1004 and network device 1006). The list can comprise any information that identifies a network and/or network device.

In some embodiments, the server also receives one or more attributes associated with a network and/or network device. In various embodiments, the digital device 1002 measures signal strength, determines available services, or takes a performance metric for one or more networks and/or network devices that are identified on the list of available wireless networks.

In step 1104, the server retrieves a network profile from a plurality of network profiles stored in a network database for each available wireless network on the list of available wireless networks. Each network profile may comprise at least one attribute. In some embodiments, not all wireless networks on the list have a network profile. When a network profile for a wireless network on this list is not found, a network profile associated with the wireless network may be then created. If attributes are received from the digital device 1002, the server may determine which attribute received from the digital device 1002 is associated with which network, network device, and/or network profile.

In step 1106, the server compares attributes from each network profile against minimum requirements. In one example, the server compares latency metrics from all network profiles in the list (if available) against a minimum latency metric. The server may also compare attributes received from the digital device 1002 against the minimum requirements. In step 1108, the server removes one or more wireless networks from the list of available wireless networks and/or wireless network profiles based on the comparison(s). For example, any wireless network with a latency metric that falls below the minimum latency metric may not be selected. In other embodiments, a wireless network with a latency metric that falls below the minimum latency metric may receive a weighted value that will be compared to other wireless networks to assist in the selection process.

In some embodiments, the user of the digital device 1010 determines the minimum requirements. In other embodiments, the minimum requirements may be selected for the user (e.g., by an administrator).

In step 1110, the server retrieves personalized settings for a user. The personalized settings may be sent by the user to the server. In some embodiments, the user has an account with the web server 1018 which contains the personalized settings. In one example, the server receives a user identifier along with the list of available wireless networks. The server then accesses the user's account and receives the personalized settings which are then applied to the attributes of the network profiles associated with a wireless network on the list. In various embodiments, users may configure personalized settings (e.g., the "aggressiveness") at which a digital device 1002 may connect to a wireless network. Such configurations could include:

(a) Connect to anything open regardless of shared indicator;

(b) connect to anything open except those with default manufacturer SSIDs (e.g., "linksys") that likely indicate the owner simply left the access point open out of the box and is unaware how to configure security functions;

(c) connect to anything open that the profile server 108 has seen (or stored information regarding the Wi-Fi network); or (d) connect to anything open with a shared indicator of "shared," or has been marked as shared by some other means.

Those skilled in the art will appreciate that there may be many personalized settings.

In step 1112, the server removes one or more wireless networks from the list or network profiles based on the personalized settings. For example, the personalized settings may indicate that the user only wishes to connect to wireless networks that support videoconferencing and maintain a user defined QOS requirement. The server may then remove any wireless networks from the list of available wireless networks based on the attributes either from the network profiles or recently received from the digital device 1002 that do not meet the user's personalized settings.

In some embodiments, the personalized settings may then be taken into account either before or after comparison of attributes from the network profiles. In one example, personalized settings indicate that the user does not wish to connect to a wireless network that is not designated as "shared" or providing certain services. In one example, the rules server 1010 either does not retrieve the network profiles associated with networks that do not provide the necessary service and/or does not compare attributes associated with those networks. In other embodiments, the digital device 1002 applies personalized settings to results (e.g., the wireless network selection) received from the rules server 1010 before accessing a preferred wireless network.

In step 1114, the server compares the attributes of the remaining wireless networks on the list. In various embodiments, the server will apply a weight and normalize one or more of the attributes (e.g., metrics) from within the network profiles. In some embodiments, older attributes may be removed or weighed less than other attributes that are newer. In one example, any metric that is over one week old may receive less weight than a similar newer metric. In another example, a metric that is over one month old may be removed from the network profiles or not considered in the comparison. Those skilled in the art will appreciate that not all attributes or information from within the network profiles may be taken into account in the comparison.

Each network profile may comprise any number of attributes. In one example, the rules server 1010 makes a wireless network selection based on comparing a metric from two different network profiles. In some embodiments, the rules server 1010 selects a wireless network based on a comparison between two similar metrics (i.e., the latency metric from the first network profile is compared to the latency metric from the second network profile). Those skilled in the art will appreciate that the rules server 1010 may select a wireless network based on comparisons between two similar recently received metrics or a recently received metric and another within a network profile.

In other embodiments, the rules server 1010 selects a wireless network based on a comparison of two dissimilar metrics (i.e., the latency metric from the first network profile is compared to a bandwidth metric from the second network profile). The rules server 1010 may execute an algorithm to weigh and normalize similar and/or dissimilar metrics or attributes in order to make a comparison for selecting the appropriate wireless network. In one example, the rules server 1010 compares a latency metric in the first network profile to a bandwidth metric in the second network profile. The rules server 1010 may execute an algorithm to weigh and normalize the metrics. The algorithm may weigh the latency metric more than the bandwidth metric since latency may have a greater impact on network performance.

An attribute or metric may receive different weights depending on any number of factors. For example, a latency metric may receive a given weight when the metric falls within an acceptable range, otherwise the latency metric may be significantly less weight. A metric recently received from the digital device 1002 may receive greater weight than a metric of a similar type within a network profile. Those skilled in the art will appreciate that there are many ways to compare similar and/or dissimilar performance and/or qualitative metrics.

In step 1116, the server selects a wireless network based on the comparison of attributes. The wireless network selection may comprise a single preferred wireless network or a list of wireless networks sorted in order of preference. In one example, the rules server 1010 identifies the most preferred network, the second most preferred network, and so on. The rules server 1010 then provides the wireless network selection to the digital device 1002 in step 1118.

In various embodiments, the rules server 1010 only compares metrics that are recently received from the digital device 1002. In one example, two latency metrics are received from the digital device 1002. Each latency metric is associated with a separate wireless network identified on a list of available networks. In this example, the rules server 1010 may select a wireless network based on a comparison of the two attributes.

Figure 12:
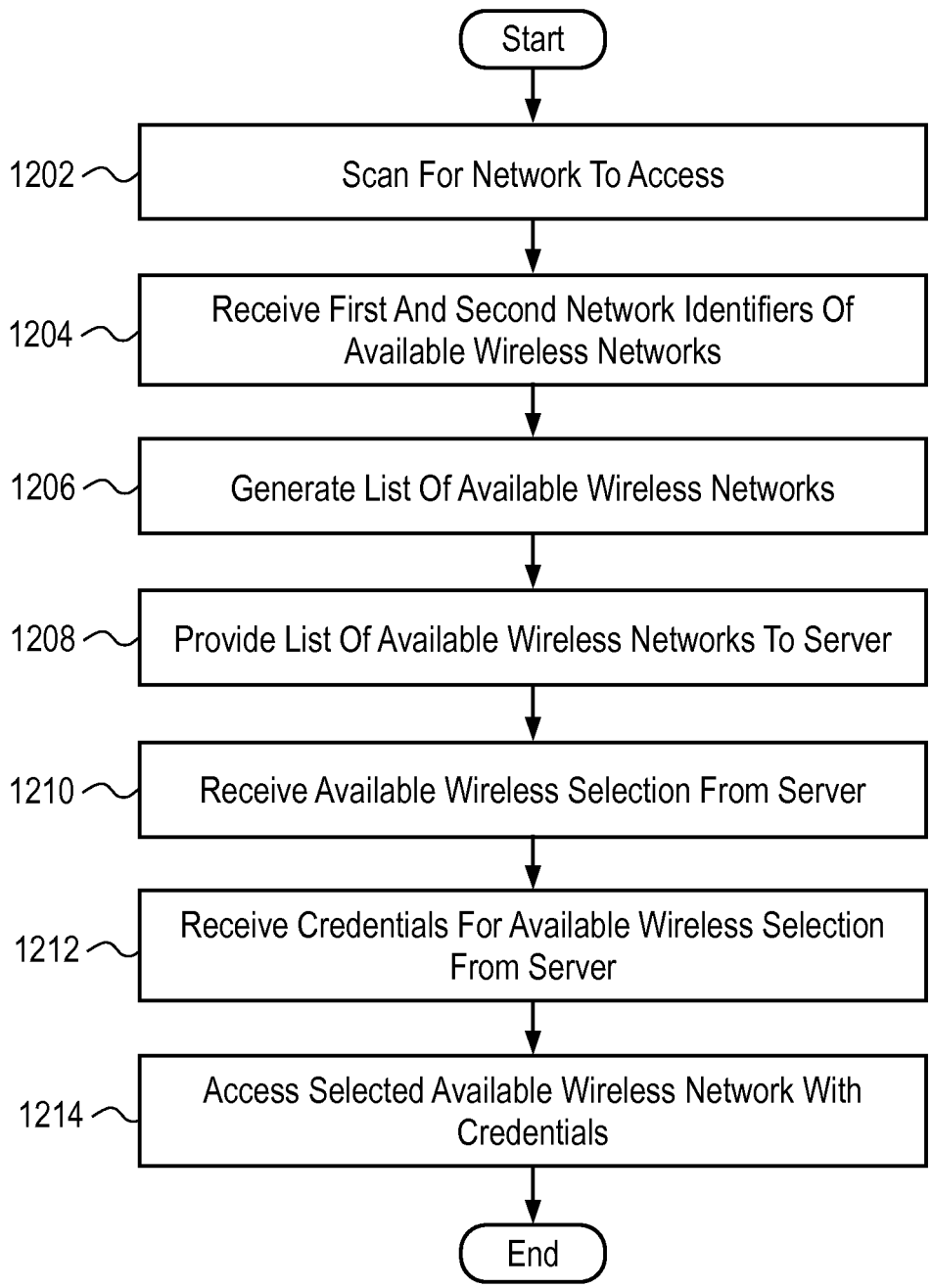
FIG. 12 is a flow diagram of an exemplary process for selecting a wireless network.

FIG. 12 is a flow diagram of an exemplary process for selecting a wireless network. In step 1002, the digital device 1002 enters into an area with two wireless networks and the digital device 1202 scans for networks to access. In step 1204, the digital device 1002 receives a first and a second network identifier of available wireless networks. As discussed herein, the first and second network identifiers may comprise BSSIDs, SSIDs, or any other network identifiers. For example, the first network identifier may comprise a BSSID and the second network identifier may comprise an SSID identifier. In another example, the first network may provide multiple identifiers including a BSSID and an SSID while the second network provides only an SSID. In this example, the first network identifier may comprise both the BSSID and the SSID of the first network device while the second network identifier is only an SSID of the second network device.

In step 1206, the digital device 1002 generates a list of available wireless networks. For example, the digital device 1002 may generate a list comprising the first network identifier and the second network identifier. The list is then provided to a server in step 1208.

In step 1210, the digital device 1002 receives a wireless network selection from the server. The wireless network selection may comprise an identifier that identifies the selected wireless network or identifies the network device associated with the selected wireless network (e.g., a BSSID and/or SSID of the network device). In various embodiments, the wireless network selection may comprise a list of wireless networks sorted by preference. The list may comprise two or more identifiers that identifies a selected wireless network or network device.

In step 1212, the digital device 1002 receives credentials for the wireless network selection from the server. In some embodiments, the credentials are received from the same server that received the list of available wireless networks from the digital device 1002.

In various embodiments, the digital device 1002 receives the wireless network selection from the server and then provides a credential request to receive the credentials for the desired network. In one example, the digital device 1002 provides the credential request in the same manner that the digital device 1002 provided the list of available wireless networks (e.g., over an open port of a network). In some embodiments, the preferred network does not require credentials or the credentials are stored locally on the digital device 1002.

In step 1214, the digital device 1002 accesses the selected wireless network with the credentials. The process of applying the credentials to a login page or the like is discussed herein.

In various embodiments, the digital device 1002 may provide the list of available wireless networks to the server over an open port of a network device in a manner similar to providing a credential request discussed herein. In other embodiments, the digital device 1002 may provide the list to the server over another network. In one example, the digital device 1002 generates a list of available Wi-Fi networks and provides the list over a cellular network (e.g., EV-DO or HSDPA network). In this example, the wireless network selection may be returned to the digital device over the cellular network and then the digital device 1002 may attempt to access the preferred Wi-Fi network.

In another example, the digital device 1002 accesses one wireless network. The digital device 1002 can then provide a list of the available wireless networks to the server. The server may return the wireless network selection to the digital device 1002. If the preferred wireless network is not the network that the digital device 1002 has originally accessed, then the digital device 1002 may drop the connection and access the preferred wireless network.

Although FIGS. 10-12 contemplate a server receiving a list of available wireless networks, determining a wireless network selection, and providing the selection to the digital device 1002, those skilled in the art will appreciate that a server is not necessary. In one example, the digital device 1002 generates a list of available wireless networks and then retrieves any available information regarding the networks on the list (e.g., from locally stored network profiles, from one or more network devices, from a local or remote database, and/or retrieving information from another network such as the Internet). The digital device 1002 may then make comparisons based on what attributes associated with the networks are available to make a selection or generate a prioritized list. The digital device 1002 may then access the selected wireless network.

In various embodiments, the digital device 1002 may generate and provide attributes regarding one or more networks to update the network profiles. In one example, the digital device 1002 determines the quality of the signal, bandwidth, or any other metrics and provides those metrics along with the list of available wireless networks to a server. In another example, as the digital device 1002 accesses a selected wireless network, measures attributes, and provides the attributes update metrics within a network profile. Attributes (e.g., latency metrics, bandwidth metrics, and QOS metrics) may be taken by the digital device 1002 at any time and used to update the network profiles.

Figure 13:
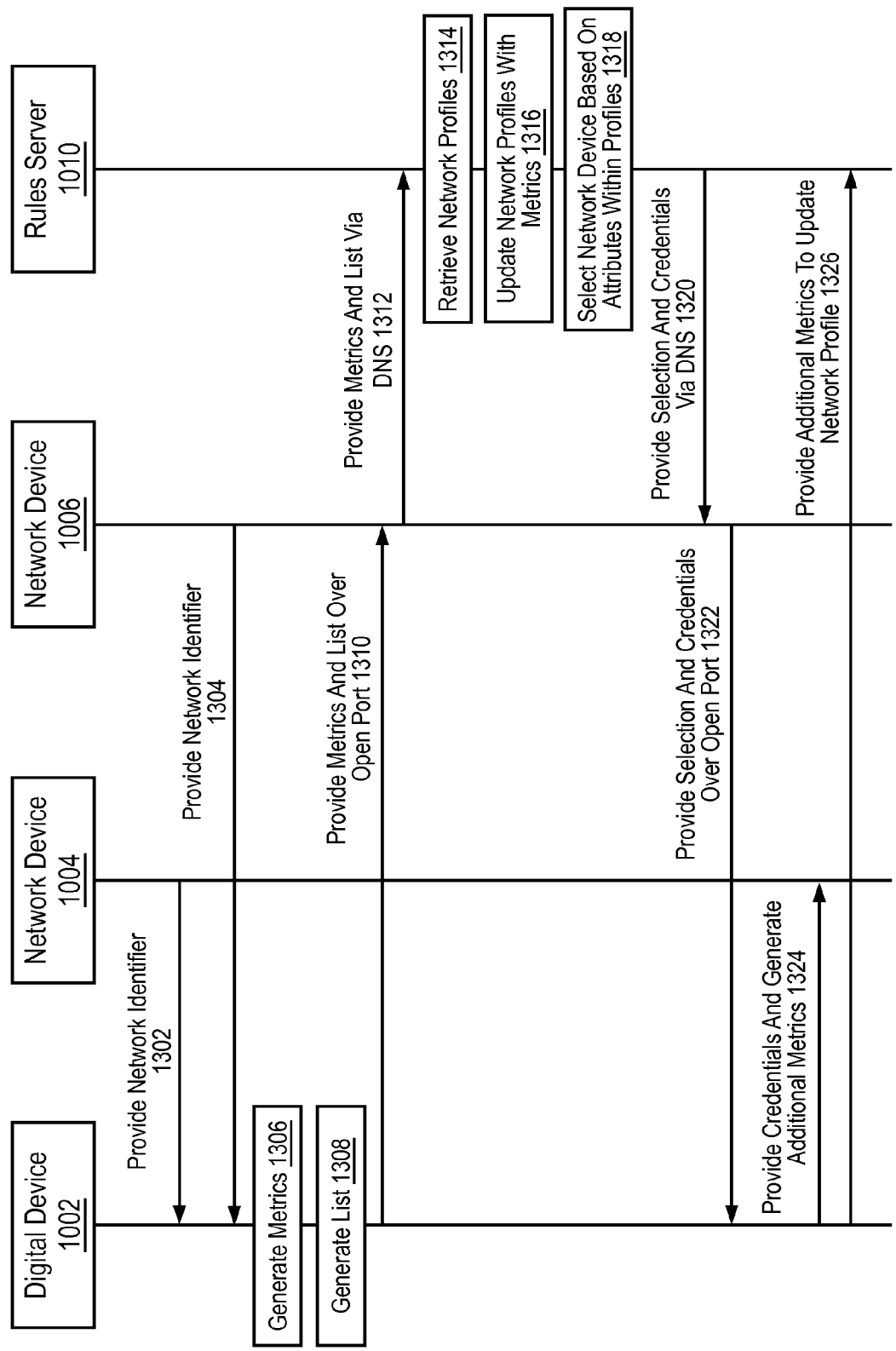
FIG. 13 is a diagram for selecting a wireless network and accessing the selected wireless network.

FIG. 13 is a diagram for selecting a wireless network and accessing the selected wireless network. In various embodiments, the network device 1004 and network device 1006 provide a first and second network identifiers to the digital device 1002 in steps 1302 and 1304. In step 1306, the digital device 1002 generates metrics (i.e., attributes) by taking measurements regarding wireless networks associated with the network device 1004 and network device 1006. In some examples, the metrics may include latency, strength of signal, or QOS metric.

In step 1308, the digital device 1002 generates a list of available wireless networks which may include the network identifier from the network device 1004 as well as the network identifier from the network device 1006. In some embodiments, the digital device 1002 may also comprise personalized settings which may indicate a preference between the two network identifiers or eliminate one or both of the network identifiers. In one example, the personalized settings indicate that only open networks that do not have a default manufacturer SSID (e.g., "linksys") may be accessed. In this example, if the network identifier from the network device 1004 indicates a default manufacturer SSID, the digital device 1002 may not include that network identifier for the network device 1004 in the list of available wireless networks.

In some embodiments, if the digital device 1002 cannot generate a list identifying at least two or more networks, the digital device 1002 does not send the list. In one example, if the digital device 1002 can only identify one available wireless network that meets the user's requirements, then the digital device 1002 may attempt to access the wireless network directly or send a credential request for to a server to retrieve any necessary credentials for access.

In step 1310, the digital device 1002 provides the attributes and the list of available wireless networks over an open port (e.g., port 53) of the network device 1006 which acts like a proxy in providing the attributes and list of available networks to the rules server 1010. In other embodiments, the digital device 1002 provides the attributes and the list over an open port of the network device 1004. Alternately, the digital device 1002 may provide the attributes and the list over separate networks (e.g., the attributes over an open port of one of the network devices and the list over a cellular network). In step 1312, the network device 1006 acts as a proxy by providing the attributes and list via DNS to the rules server 1010.

In step 1314, the rules server 1010 retrieves network profiles. In one example, the rules server 1010 retrieves the network identifiers from the list and retrieves network profiles associated with the network identifiers.

In step 1316, the rules server 1010 (or profile server 1014) updates attributes within the network profiles with the attributes received from the digital device 1002. In one example, a new latency metric from the digital device 1002 is used to update the network profile associated with the network identifier from the network device 1004. A time-to-live value associated with the attribute may also be updated to indicate that the new latency metric is recent.

In step 1318, the rules server 1010 selects a network device based on comparing the attributes from within the network profiles. In some embodiments, the rules server 1010 also applies personalized settings from the digital device 1002 or from an account associated with the digital device 1002 (e.g., via the web server 1018) before making a selection. The rules server 1010 may prepare a prioritized list of the two network devices from the list provided by the digital device 1002. The list is prioritized based on which of the two network devices provides the most desirable service based on the metrics from the network profiles.

In step 1320, the rules server 1010 provides the wireless network selection and credentials via DNS back to the network device 1006 to function as a proxy to send the information to the digital device 1002. In one example, the rules server 1010 selects the network device 1004. The rules server 1010 may retrieve credentials for the network device 1004 based on the network identifier of the network device 1004. For example, the rules server 1010 may provide a credential request to the credential server 1016. The credential server 1016 may provide a credential request response containing necessary credentials to the rules server 1010 which then sends both the credentials received from the credential server 1016 as well as the wireless network selection to the digital device 1002.

In step 1322, then network device 1006 provides the network selection and the credentials over the open port to the digital device 1002. In step 1324, the digital device 1002 provides the credentials to access the network device 1004 and generates additional attributes regarding the network (i.e., take additional measurements). Once a connection is established, the new attributes are provided to the rules server 1010 or profile server 1014 to update the network profile associated with the network device 1004 in step 1326. In one example, the digital device 1002 may measure the time required to establish the connection with the network device 1004. The time required to establish the connection may then be used to update attributes in a network profile. If a connection is not established or fails, that information may also be provided to update the associated network profile.

In some embodiments, if the network connection with the selected network fails, the digital device 1002 may re-attempt to make the connection. If multiple attempts to make the connection fail, information regarding the failure is sent to update the associated network profile. The digital device 1002 may then attempt to make a connection with another network device (e.g., the network device 1006). In some embodiments, the digital device 1002 re-scans the area, generates a new list of available networks which may not include the network that the digital device 1002 failed to connect. The new list may be sent to the rules server 1010 to receive a new wireless network selection and the process may repeat.

In some embodiments, the rules server 1010 provides a prioritized list of available wireless networks sorted by preference. In one example, the rules server 1010 provides a prioritized list of three networks to the digital device 1002. The digital device 1002 may then attempt to access the first wireless network on the prioritized list. If the digital device 1002 is unable to connect to the first wireless network, then the digital device 1002 may proceed to attempt to connect to the next network on the list. Those skilled in the art will appreciate that the prioritized list may contain all, one, or some of the wireless networks identified in the list of available wireless networks. For example, the rules server 1010 may not identify wireless networks which are known to provide poor performance, do not provide desired service (e.g., VOIP service), and/or are otherwise blacklisted.

In various embodiments, the user of the digital device 1002 may override the wireless network selection to access any wireless network. In one example, the user chooses the priority of available wireless networks. In some embodiments, the user may configure the digital device 1002 or configure an account with the web server 1018 to include personal preferences that may reorder or otherwise alter a prioritized list of wireless networks from the rules server 1010. For example, the list of available wireless networks may be altered based on user preferences by the digital device 1002 or the web server 1018 prior to being provided to the rules server 1010.

In some embodiments, in addition to one or more open Wi-Fi networks, there may also be one or more encrypted Wi-Fi networks in a given location. A digital device 1002 may connect to an open Wi-Fi network and transmit the SSID of other Wi-Fi networks, including encrypted Wi-Fi networks, to the rules server 1010 via a network communication protocol such as HTTP.

The rules server 1010 may then determine, based on personalized settings or other rules, that an available encrypted Wi-Fi network is the preferred choice for a network connection. The rules server 1010 may transmit the necessary encryption keys to the digital device 1002 over the current open Wi-Fi network connection and send instructions to the digital device 1002 to switch to the encrypted Wi-Fi network.

As discussed herein, an SSID or other network identifier may be insufficient to identify network credentials necessary to access a network. For example, multiple networks may share or may potentially share the same SSID or other network identifier. As such, the credential server may provide network credentials for at least one of the networks with the SSID. If the digital device is unsuccessful in gaining access to the network, the digital device may submit a new credential request to the credential server. The credential server may then provide the network credentials for a different network sharing the same SSID. This process, in some embodiments, may continue until the correct network credentials are provided, a predetermined amount of time is expired, or a predetermined number of attempts are made.

In some embodiments, the credential server may select the network credentials from the potential variety of networks sharing the same SSID in any number of ways. For example, the credential server may provide the network credentials for the most commonly accessed network by the largest number of people. In some embodiments, the credential server may provide the network credentials for the most commonly access network by the user or digital device requesting access. The credential server may alternately provide the network credentials for the network that is located most closely to the user (e.g., through GPS location information, AGPS location information, or through a list of other network available to the digital device as may be identified by a scan by the digital device). If network credentials previously provided to the digital device are unsuccessful, the credential server may select new network credentials based on another method.

In some embodiments, the credential server 116 may request additional network information rather than provide network credentials. For example, the credential server may receive a network identifier and determine that the network identifier is shared or may be potentially shared by multiple networks. Subsequently, the credential request response may request additional network information from the digital device. Additional network information may comprise any additional information regarding the network including, for example, a title of a web page from a network device associated with the network or any other information. The digital device may then provide the additional network information to the credential server which may subsequently identify the correct network credentials to provide to the digital device.

Figure 14:
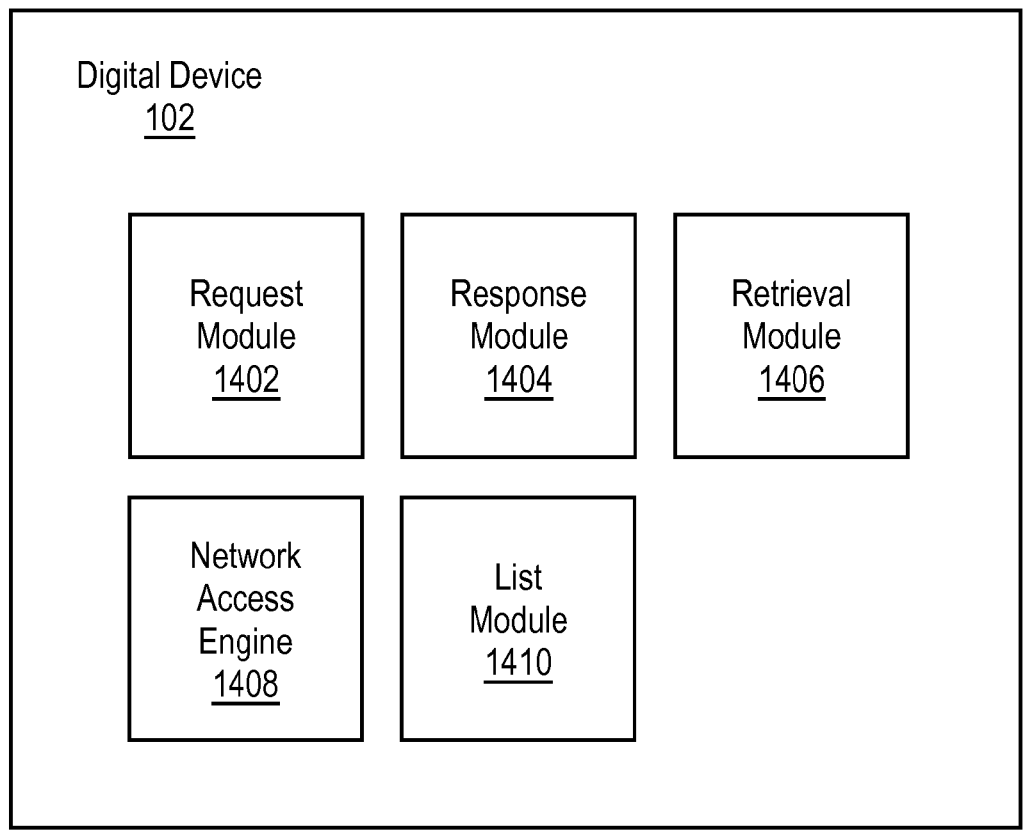
FIG. 14 is a box diagram of a digital device in some embodiments.

FIG. 14 is a box diagram of a digital device 102 in some embodiments. In various embodiments, the digital device 102 may be configured to provide additional network information to the credential server 116 to receive network credentials when the network identifier associated with a network may be shared. The digital device 102 may comprise a request module 1402, a verification module 1404, a retrieval module 1406, a network access engine 1408, and a list module 1410. The digital device 102 may, in many respects, perform as discussed herein.

The request module 1402 may be configured to scan an area in proximity to the digital device 102 and receive one or more network identifiers, such as SSIDs, associated with wireless network(s). The request module 1402 may also be configured to generate a credential request including the one or more network identifiers. The credential request may be formatted as a DNS protocol message. The credential request may be formatted in a UDP protocol. The request module 1402 may provide the credential request to a network via a network device associated with at least one of the scanned networks. As discussed herein, the network device may include at least one open port, such as port 53. The request module 1402 may provide the credential request to the credential server 116 via the open port.

The response module 1404 may receive a credential request response from the credential server 116 (e.g., via the open port of the network device 104). In various embodiments, the response module 1404 may either retrieve network credentials or a request for additional network information from the credential request response. In one example, if the credential server 116 determines there is insufficient information (e.g., the SSID is shared by multiple networks), the credential server 116 may provide a credential request response that requests additional network information from the digital device 102.

Additional network information may include any information regarding the network. In some embodiments, the additional network information includes an SSID, BSSID, title of a webpage received from the network device 104, Wireless Internet Service Provider roaming (WISPr) tags, a first header on a web page, and/or a URL for redirection received from the network device 104. Those skilled in the art will appreciate that the additional network information may include any information including identifiers that identify the network device, identifiers that identify the network, or information received from the network device (e.g., a login page, a redirect page, or a web page with fields requesting information).

The retrieval module 1406 may be configured to provide additional information to the credential server 116 based on the request for additional network information. In various embodiments, the retrieval module 1406 generates a second credential request including additional network information previously received from the network device 104. In some embodiments, the retrieval module 1406 retrieves additional network information from the network device 104. For example, the retrieval module 1406 may request and receive a web page from the network device 104. The retrieval module 1406 may then provide the title, URL of a web page, a redirect page identifier, an identifier associated with one or more fields of a web page received from the network device 104, or the like, within a second credential request. The request module 1402 may then provide the second credential request to the network (e.g., in a method similar to that as discussed regarding the initial credential request). Like the first credential request, the second credential request may be formatted as a DNS protocol message. The credential request may be formatted in a UDP protocol.

If the network identifier and/or the additional network information is sufficient, the response module 1404 may receive a second credential request response from the credential server 116 in response to the second credential request. The second credential request may include network credentials.

The network access engine 1408 may be configured to provide the network credentials to a wireless network associated with the network identifier and/or the additional network information. The network access engine 1408 may be configured to provide the network credentials to the network as described herein as well as co-pending U.S. patent application Ser. No. 11/899,697, entitled "System and Method for Acquiring Network Credentials," filed Sep. 6, 2007, which is incorporated herein.

If network access is granted, the network access engine 1408 may optionally send a message to the credential server 116 to confirm that the network credentials provided were successful. If network access is not granted, the network access engine 1408 may notify the retrieval module 1406 to provide additional network information in another credential request and/or may generate a message to the credential server 116 that the access attempt with the network credentials received was unsuccessful. If the digital device 102 does not access the network the digital device 102 may provide a log of information to the credential server 116 regarding the attempted access when the digital device 102 next successfully gains access to a network.

In some embodiments, whitelists and/or blacklists may be used to reduce or avoid sending multiple credential requests. For example, the list module 1410 may be configured to check one or more network identifiers against a whitelist and/or a blacklist. The whitelist and/or blacklist may be updated periodically by the credential server 116 or any other digital device 102.

In some embodiments, the list module 1410 checks a network identifier against a blacklist. If the network identifier (e.g., an SSID) is on the blacklist, additional network information may be required. For example, the blacklist may comprise a list of SSIDs that may be shared by multiple networks. If the network identifier is on a blacklist, the list module 1410 may notify the retrieval module 1406 to provide additional network information within a credential request. The credential server 116 receiving the credential request may use the network identifier and the additional network information to provide the network credentials. In some embodiments, the blacklist includes a list of SSIDs that may be shared by multiple networks as well as instructions as to what additional network information that may be provided to improve the speed and/or possibility of receiving the correct network credentials.

In some embodiments, the list module 1410 checks a network identifier against a whitelist. If the network identifier (e.g., an SSID) is on the whitelist, additional network information may not be required. For example, the whitelist may comprise a list of SSIDs that may not be shared by multiple networks. If the network identifier is not on the whitelist, however, the list module 1410 may notify the retrieval module 1406 to provide additional network information within a credential request. The credential server 116 receiving the credential request may use the network identifier and the additional network information to provide the network credentials.

In some embodiments, the blacklist comprises a list of network identifiers (e.g., SSIDs or BSSIDs) of network devices that the digital device 102 does not have permission to access. For example, an owner of an unprotected network device may wish for only a limited number of people (e.g., friends or customers at a specific coffee shop) to access the network. In some embodiments, the digital device 102 may receive the network identifier of the unprotected network device and the network identifier may be compared against the blacklist (e.g., either by the digital device 102 or the credential server 116). If the network identifier is associated with the blacklist, the digital device 102 may either stop attempting to connect to the network or disconnect from the network.

The whitelist may also comprise a list of network identifiers that are associated with networks that the digital device 102 is allowed to access. For example, the digital device 102 or the credential server 116 may check the network identifier against the whitelist to determine if the network is associated with the whitelist. If the network is associated with the whitelist, the digital device 102 may connect or remain connected to the network. In some embodiments, the whitelist comprises a list of preferred networks. In this example, the digital device 102 may select a network identifier associated with the whitelist from a list of multiple available networks.

Figure 15:
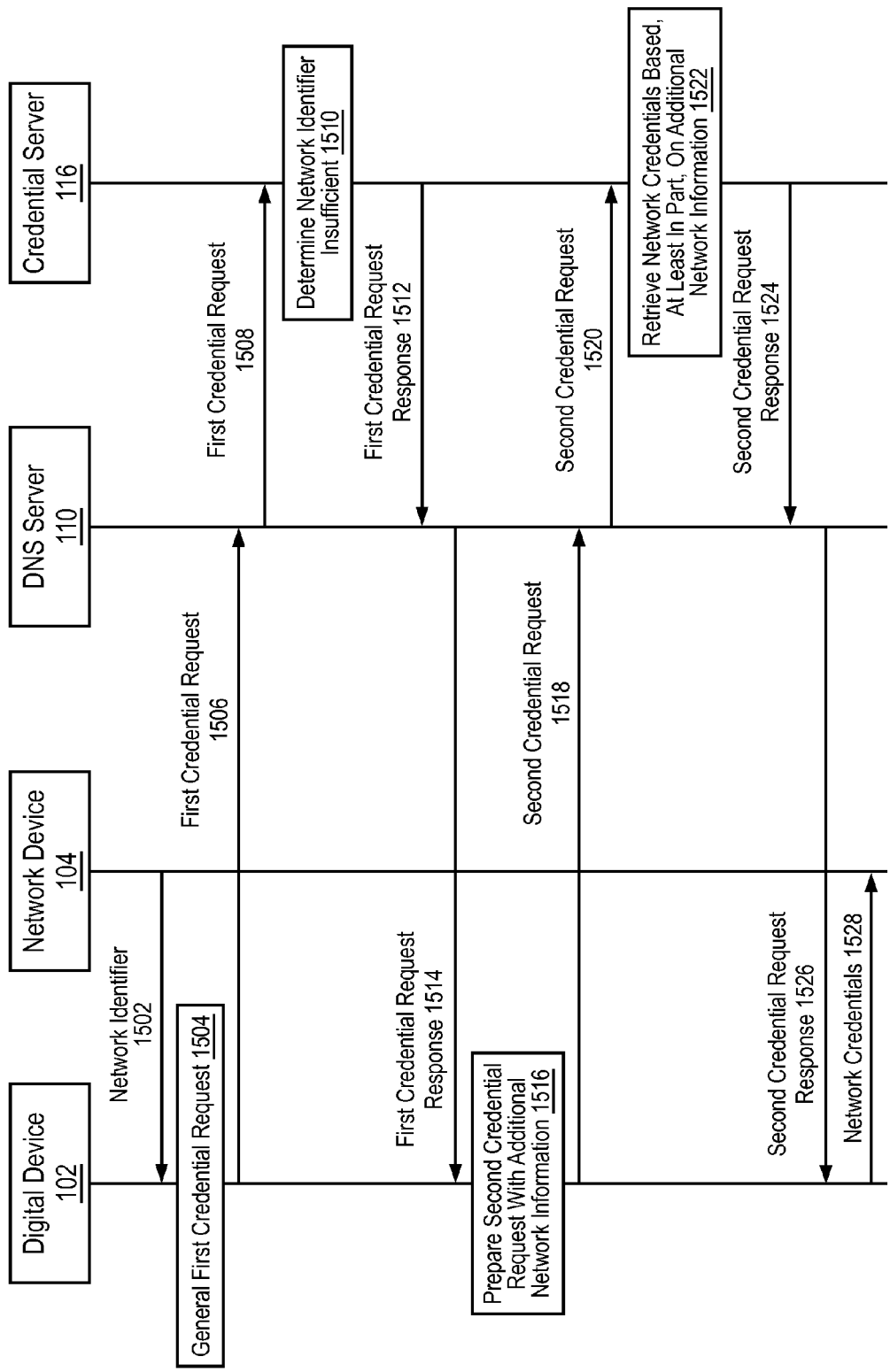
FIG. 15 is a flow diagram of an exemplary method for retrieving network credentials when a network identifier may be insufficient to identify network credentials in some embodiments.

FIG. 15 is a flow diagram of an exemplary method for retrieving network credentials when a network identifier may be insufficient to identify network credentials in some embodiments. The flow diagram depicts communication and activities between and by the digital device 102, the network device 104, the DNS server 110, and the credential server 116 in some embodiments. In various embodiments, the digital device 102 may scan an area proximate to the digital device 102 to identify one or more wireless networks. In step 1502, a network device 104 may respond to the scan from the digital device 102 and provide a network identifier. In some embodiments, the network identifier is an SSID and/or a BSSID.

In step 1504, the digital device 102 generates a first credential request containing the received network identifier. The first credential request may also comprise a digital device 102 identifier, a software license number, or any other information. The first credential request may be encoded. For example, the information within the first credential request may be hex-encoded.

In various embodiments, the first credential request is in a DNS protocol which is provided to the DNS server 110 via an open port (e.g., port 53) of the network device 104. The DNS server 110 may redirect the first credential request to the credential server 116 in step 1508.

The credential server 116 may comprise or be the rules server 1010. In some embodiments, the credential server 116 receives the first credential request and may retrieve the network identifier. In some embodiments, the credential server 116 decodes the first credential request in order to retrieve of the network identifier.

In step 1510, the credential server 116 determines if the network identifier is sufficient to identify a network credential. For example, the network identifier may possibly be shared with another network. In some embodiments, the credential server 116 scans a data structure such as a table, database, or any other data structure, to determine if the network identifier from the first credential request is possibly shared by two or more networks. In one example, the data structure is a blacklist which includes a list of network identifiers that are commonly shared by multiple networks.

In some embodiments, the credential server 116 may determine that there is insufficient information to identify a network credential. In one example, the network identifier may comprise both an SSID and a BSSID. The SSID may be associated with multiple networks and the credential server 116 may have no network credentials associated with the BSSID (e.g., a MAC address of the network device). If the network identifier is insufficient, the credential server 116 may generate a first credential request response requesting additional network information. The additional network information may be used by the credential server 116 to identify the correct network and/or network credential.

In various embodiments, the request for additional network information comprises a request for any additional information that the digital device 102 may have access regarding the network device 104. In some embodiments, the credential server 116 determines what additional network information is necessary to distinguish the network credentials and specifically requests for that additional network information only. For example, the title of a web page received from the network device 104 may be sufficient to differentiate between two possible networks. The credential server 116 may include a request the title of the web page of the network device 104 in the first credential request response. In other embodiments, the credential server 116 may request a variety of different types of additional network information.

The first credential request response containing the request for additional network information may be provided back to the DNS server 110. In one example, the first credential request response is formatted as a UDP protocol and provided back to the digital device 102 in a manner similar to the process that the credential server 116 received the first credential request. The DNS server 110 may receive the first credential request response and redirect the first credential request response back to the digital device 102 via the open port of the network device 104 in step 1514.

In step 1516, the digital device 102 retrieves the request for additional information from the first credential request response and prepares a second credential request with additional network information 1516. In some embodiments, the digital device 102 requests a web page from the network device 104. The request may be a request for network access. The additional network information may comprise information received from the network device 104 including the SSID, BSSID, IP address, or any other information. In some embodiments, the additional network information may comprise a title, hash, WISPr tag, or URL of a web page or any part of a web page received from the network device 104.

In step 1518, the digital device 102 provides the second credential request to the DNS server 110. The second credential request may be encoded. Like the first credential request, the second credential request may be formatted as a UDP protocol and provided to the DNS server 110 via the open port on the network device 104. The DNS server 110 may subsequently direct the second credential request to the credential server 116 in step 1520.

In step 1522, the credential server 116 retrieves network credentials, based, at least in part, on the additional network information. The credential server 116 may also retrieve the network credentials based, at least in part, on the network identifier and/or other additional network information previously received from the digital device 102. In one example, the credential server 116 may retrieve the network credentials from a data structure associated with the network identifier and/or any additional network information. The credential server 116 may include the network credentials in a second credential request response. The second credential request response may be encoded and/or encrypted in a manner similar to the first credential request response.

In step 1524, the second credential request response is provided back to the DNS server 110 which directs the second credential request response to the digital device 102 in step 1526. Those skilled in the art will appreciate that although only a single DNS server 110 appears in FIG. 15, there may be any number of DNS servers directing different credential request(s) and/or credential request response(s). Similarly, although there is only one credential server 116 depicted in FIG. 15, there may be any number credential servers in communication with the digital device 102.

In step 1528, the digital device 102 retrieves the network credentials from the second credential request response and provides the network credentials to the network device 104. In various embodiments, the digital device 102 may authenticate and/or decode the second credential request response in a manner similar to or different from another credential request response (e.g., the first credential request response).

Those skilled in the art will appreciate that the credential server 116 may request a variety of different network information in any order. For example, in some embodiments, the credential server 116 may provide a prioritized list of additional network information to the digital device 102. The digital device 102 may go through the prioritized list, determining if the request additional network information is available. If the additional network information is available, the digital device 102 may provide the additional network information to the credential server 116 in a second credential request. In some embodiments, the digital device 102 may provide only some of the additional network information to the credential server 116. If the credential server 116 determines that the network identifier and/or the additional network information is shared by two or more networks or is otherwise insufficient, the credential server 116 may provide a request for more network information in another credential request response.

Although the network identifier is described with respect to FIG. 15 as being an SSID, those skilled in the art will appreciate that the network identifier may be any identifier or combination of identifiers (e.g., BSSID). For example, the network device 104 may provide a BSSID to the digital device 102. If the BSSID has not been previously identified or is otherwise insufficient, the credential server 116 may request more information within the first credential request response in step 1512. In response, the digital device 102 may provide additional network information to the credential server 116 in order to receive the second credential request response with the network credentials.

Figure 16:
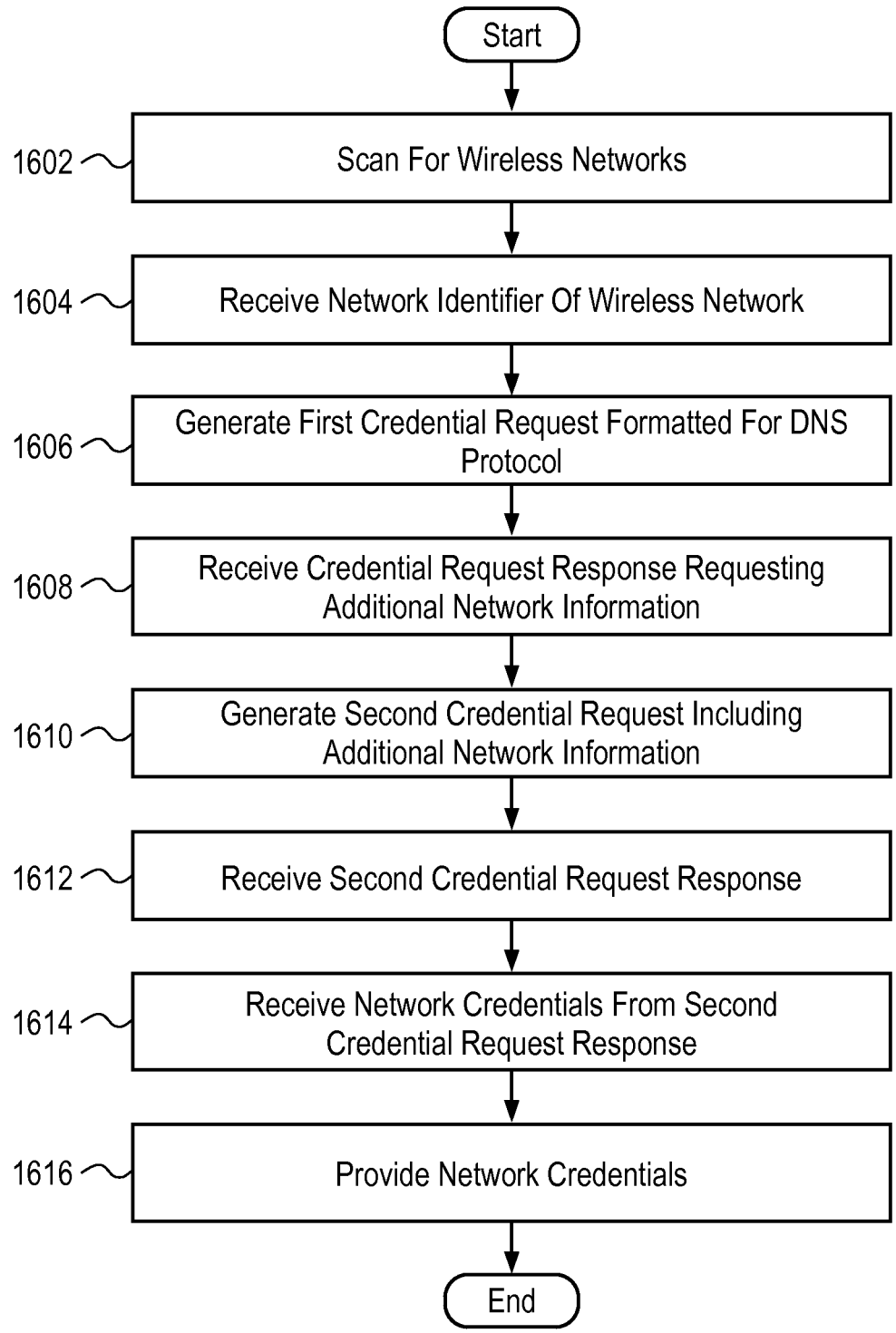
FIG. 16 is a flowchart of an exemplary method for a digital device to receive network credentials when a network identifier is insufficient in some embodiments.

FIG. 16 is a flowchart of an exemplary method for a digital device 102 to receive network credentials when a network identifier is insufficient in some embodiments. In step 1602, the digital device 102 scans an area for available one or more available wireless networks. In one example, the digital device 102 scans a McDonald's restaurant for an available wireless network. In step 1604, the digital device 102 receives a network identifier of a wireless network. In this example, AT&T may provide network services to the McDonald's restaurant. A network device at the McDonald's restaurant may subsequently identify an available network (e.g., provide an SSID) as "attwifi."

In step 1606, the digital device 102 generates a first credential request formatted for the DNS protocol. The first credential request may include the network identifier "attwifi" as well as other information, such as, but not limited to, a digital device 102 identifier (e.g., MAC address). The digital device 102 may provide the first credential request over a network via an open port on the network device or over another network device.

In step 1608, the digital device 102 receives a first credential request response over the network via the open port on the network device or over another network device. The digital device 102 may retrieve a request for additional network information from the first credential request response. In response, the digital device 102 may provide additional network information already received from the network device. In one example, the digital device 102 may have received an SSID as well as information regarding a web page received from the network device. Although the digital device 102 may have only provided the SSID as the network identifier in the first credential request, the digital device 102 may provide the additional network information in a second credential request.

In step 1610, the digital device 102 generates a second credential request including the additional network information. In one example the second credential request response may comprise the previously provided network identifier (e.g., SSID of the network device) and/or the additional network information for the network device. The digital device 102 may subsequently provide the second credential request over the network.

In step 1612, the digital device 102 may receive a second credential request response. The second credential request response may comprise network credentials. In other embodiments, the second credential request response may request additional network information and the process may repeat starting with step 1610 as a new credential request may be generated with additional network information. In some embodiments, the second credential request response may be an indication that a network credential is not available and the process may end.

In step 1614, the digital device 102 retrieves network credentials, if available, from the second credential request response. As discussed herein, the digital device 102 may authenticate, decode, and/or decrypt the second credential request response. In step 1616, the digital device 102 may provide the network credentials from the second credential request response to the network device.

Figure 17:
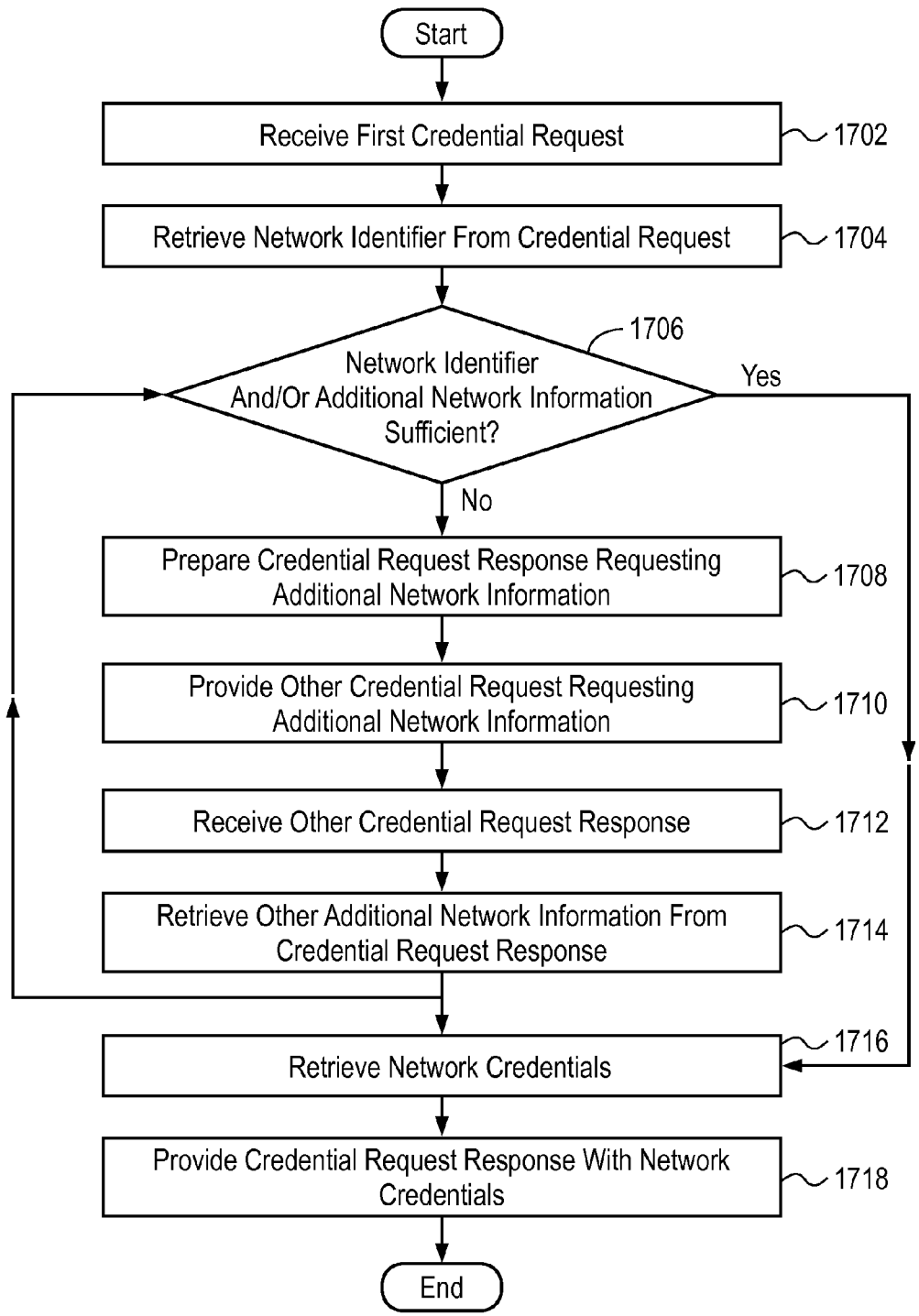
FIG. 17 is a flowchart of an exemplary method for a credential server 116 to provide network credentials in some embodiments.

FIG. 17 is a flowchart of an exemplary method for a credential server 116 to provide network credentials in some embodiments. In step 1702, the credential server 116 may receive the first credential request from the digital device 102. The credential server 116 may decode the first credential request to retrieve the network identifier (e.g., the SSID of "attwifi") in step 1704.

In step 1706, the credential server 116 may determine that the network identifier is insufficient to identify one or more network credentials. In one example, the SSID of "attwifi" may identify a wide number of network devices that provides network access by AT&T including other restaurants, coffee shops, and the like. One or more of the other network devices may require different network credentials. For example, AT&T may offer network access at McDonald's may be free for a limited time while, at the same time, AT&T may require a purchase or card number at Starbucks. Network devices at both McDonald's and Starbucks, however, may share the same SSID.

The credential server 116 may determine that the network identifier provided in the first credential request may be insufficient to determine the correct network credential (e.g., a network credential comprising a card number at Starbucks or the correct entries for a web page required for free access at a McDonald's).

An additional network information may be required by the credential server 116. For example, only a limited number of McDonald's may allow for free wireless access through the network service provider, AT&T. As such, the credential server 116 may require the SSID (e.g., "attwifi") and a URL to a redirected web page (e.g., "http://www.McDonalds.com/ATTmobile/freeaccess"). Once a sufficient amount of information is received, the credential server 116 may provide network credentials to the digital device 102.

Those skilled in the art will appreciate that the network identifier and/or additional network information may not be unique to only one network or network device. In the above example, two or more McDonald's participating in the promotion to provide free wireless access may provide the same network identifier and at least some similar additional network information. In some embodiments, once the credential server 116 determines that the desired network credentials are sufficiently identifiable (e.g., the network device providing the network identifier belongs to a participating McDonald's), the desired network credentials may be provided.

In some embodiments, the credential server 116 determines one or more aspects of the service being provided by the network device in order to identify one or more network credentials. For example, some hotels or libraries may comprise multiple network devices which may each have a separate network identifier (e.g., room 101, room 102 . . . ). If the credential server 116 receives a network identifier that the credential server 116 does not recognize, the credential server 116 may provide a credential request response requesting additional information such as the title to a login web page. The digital device 102 may provide the title which indicates "Hyatt Hotel, Austin, Tex." Since, in this example, all Hyatt hotels may share the same network credential (e.g., all Hyatt hotels share the same login page), the credential server 116 may provide the correct network credential without specifically identifying which Hyatt hotel in Austin, Tex., may be associated with the specific SSID and title.

The credential server 116 may identify that sufficient information has been received from a credential request in any number of ways. In one example, the credential server 116 compares the network identifier and additional network information against a data structure. The data structure may indicate, for example, what network identifier and/or additional network information may be sufficient to identify one or more network credentials. Alternately, the data structure may indicate, for example, what network identifier and/or additional network information is insufficient to identify one or more network credentials. The data structure may, in some embodiments, identify what further additional network information may be used to identify one or more network credentials.

If the network identifier is sufficient to identify the network credential, the credential server 116 may retrieve network credentials based on the network identifier in step 1716. If the network identifier is not sufficient to identify the network credential(s), the credential server 116 may prepare an other (i.e., a second) credential request response requesting additional network information in step 1708. In some embodiments, the credential server 116 may include an identifier in the credential request response that may identify what additional network information may be useful to provide the network credential(s). In step 1710, the credential server 116 provides the credential request response to the digital device 102.

In step 1712, the credential server 116 may receive another credential request (i.e., a second credential request) from the digital device 102. The credential server 116 may retrieve additional network information from the other credential request. The credential server 116 may then determine if the network identifier and/or the additional network information from one or more of the previously received credential request is sufficient to identify network credentials. If the network identifier and/or the additional network information is insufficient, the process may continue in step 1708 with the credential request preparing another credential request response requesting additional network information. If the network identifier and/or the additional network information are sufficient, then the credential server 116 may retrieve the network credentials in step 1716.

In step 1718, the credential server 116 may provide the network credentials within a credential request response to the digital device 102.

Figure 18:
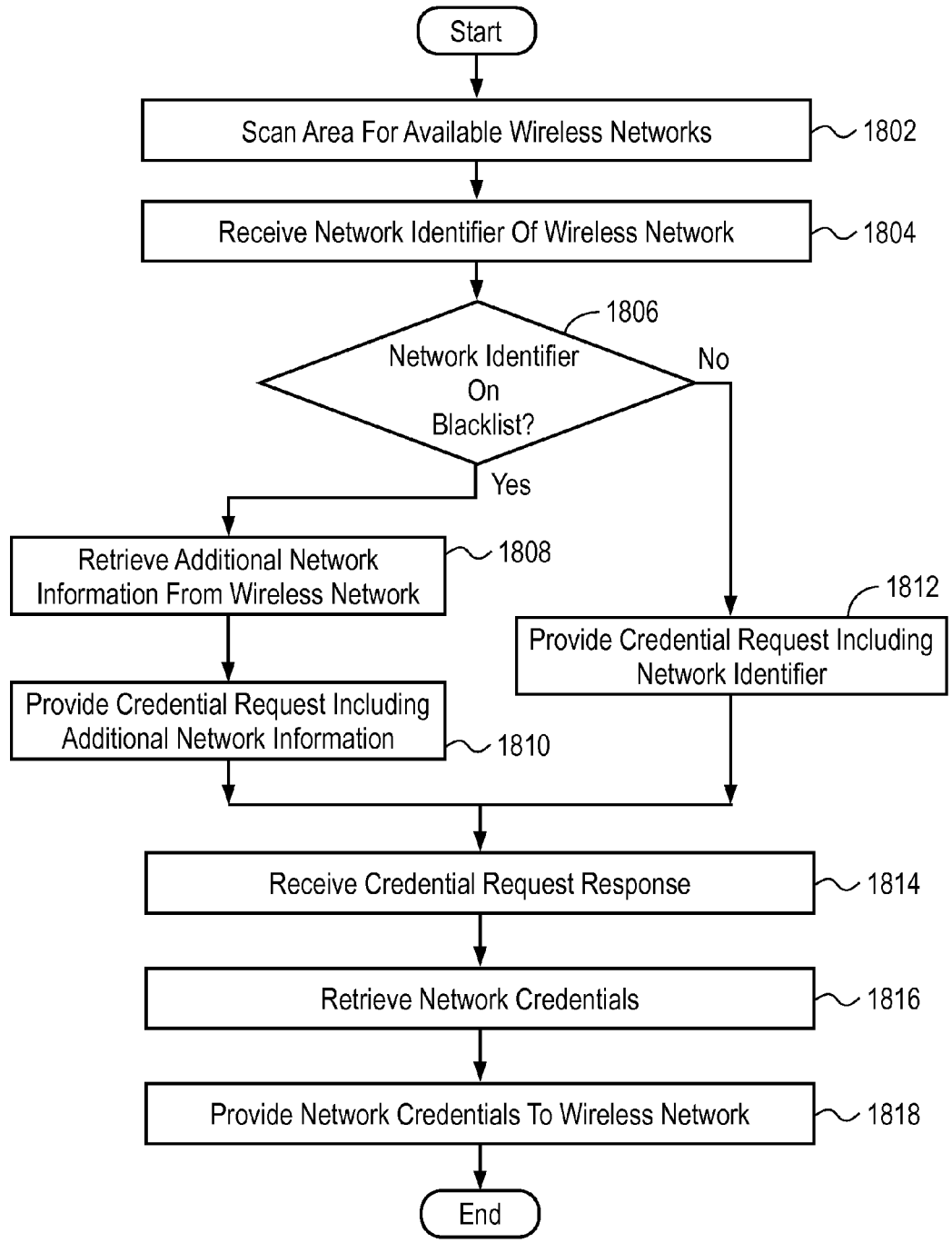
FIG. 18 is a flowchart of another exemplary method for a digital device to receive network credentials when a network identifier may be shared by two or more networks in some embodiments.

FIG. 18 is a flowchart of another exemplary method for a digital device 102 with a blacklist to provide additional network information sufficient to identify one or more network credentials in some embodiments. In step 1802, the digital device 102 scans an area for available wireless networks. The digital device 102 subsequently receives at least one network identifier of a wireless network.

In step 1806, the digital device 102 determines if the network identifier of the wireless network is identified on a blacklist. If the network identifier is identified or associated with the blacklist, the digital device 102 may retrieve additional network information in step 1808. Those skilled in the art will appreciate that the retrieval of additional network information may be from the network device or from storage (e.g., RAM, cache, or hard drive) of the digital device 102. The additional network information and/or the network identifier may be provided in a credential request in step 1810.

If the network identifier is not identified or associated with the blacklist, the digital device 102 may provide the credential request including the network identifier over the network (e.g., over an open port of a network identifier).

In step 1814, the digital device 102 may receive a credential request response including network credentials. In one example, the credential server 116 may receive the network identifier and/or the additional network information and have sufficient information to provide the network credentials in the credential request response. The digital device 102 may retrieve the network credentials in step 1816 and provide the network credentials to a network device in step 1818.

Those skilled in the art will appreciate that even if additional network information is provided, the credential server 116 may determine that even more information is needed and returns a credential request response with a request for more additional network information. In some embodiments, the digital device 102 comprises a whitelist indicating when sufficient information may be found as discussed herein.

Those skilled in the art will appreciate that the blacklist and/or whitelist may be updated periodically (e.g., by the credential server 116). Further, the blacklist and/or whitelist may be a part of an application that is installed on the digital device 102. In other embodiments, the blacklist and/or whitelist is maintained by the credential server 116. In one example, the credential server 116 may receive the credential request from the digital device 102. The credential server 116 may then check a network identifier against a blacklist. If the network identifier is associated with the blacklist, the credential server 116 may not provide the network credentials for the network device associated with the network identifier or provide a message to the digital device 102 with a request or instructions to disconnect from the network device.

In some embodiments, the credential server 116 checks a network identifier against a whitelist to identify a preferred network and/or express permission to access. In one example, if the network identifier is not associated with the whitelist, the credential server 116 may not provide the network credentials for the network device associated with the network identifier or provide a message to the digital device 102 with a request or instructions to disconnect from the network device.

The above-described functions and components can be comprised of instructions that are stored on a storage medium such as a computer readable medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and storage medium.

The present invention is described above with reference to exemplary embodiments. It will be apparent to those skilled in the art that various modifications may be made and other embodiments can be used without departing from the broader scope of the present invention. Therefore, these and other variations upon the exemplary embodiments are intended to be covered by the present invention.

The invention claimed is:

1. A method comprising:
    receiving, by a first digital device, a network identifier from a network device, the network device configured to provide network access to the first digital device;
    providing, by the first digital device, a first credential request including the network identifier to another digital device on a network;
    receiving, by the first digital device, a request for additional network information from the other digital device;
    providing, by the first digital device, a second credential request including additional network information to the other digital device;
    receiving, by the first digital device, a credential request response including network credentials from the other digital device, the credential request response being based, at least in part, on the additional network information; and
    providing, by the first digital device, the network credentials from the credential request response to the network device, the network credentials to allow or assist in allowing network access to the first digital device.

2. The method of claim 1, wherein the first credential request is formatted as a Domain Name System (DNS) protocol message.

3. The method of claim 1, wherein the first credential request is provided to the other digital device via an open port on the network device.

4. The method of claim 3, wherein the open port is port 53.

5. The method of claim 1, wherein the network identifier is a Service Set Identifier (SSID).

6. The method of claim 1, wherein the additional network information is a Basic Service Set Identifier (BSSID).

7. The method of claim 1, wherein the additional network information is a title to a web page received by the first digital device from the network device.

8. The method of claim 1, wherein the additional network information is a URL of a web page received by the first digital device from the network device.

9. The method of claim 1, wherein the additional network information is a hash of any portion associated with a web page received by the first digital device from the network device.

10. A system comprising:
    a request module configured to receive a network identifier from a network device, the network device configured to provide network access to a first digital device; and
    a response module configured to provide a first credential request including the network identifier to another digital device on a network, receive a request for additional network information from the other digital device, provide a second credential request including additional network information to the other digital device, receive a credential request response including network credentials from the other digital device, the credential request response being based, at least in part, on the additional network information, and provide the network credentials from the credential request response to the network device, the network credentials to allow or assist in allowing network access to the first digital device.

11. The system of claim 10, wherein the first credential request is formatted as a Domain Name System (DNS) protocol message.

12. The system of claim 10, wherein the response module provides the first credential request to the other digital device via an open port on the network device.

13. The system of claim 12, wherein the open port is port 53.

14. The system of claim 10, wherein the network identifier is a Service Set Identifier (SSID).

15. The system of claim 10, wherein the additional network information is a Basic Service Set Identifier (BSSID).

16. The system of claim 10, wherein the additional network information is a title to a web page received by the first digital device from the network device.

17. The system of claim 10, wherein the additional network information is a URL of a web page received by the first digital device from the network device.

18. The system of claim 10, wherein the additional network information is a hash of any portion associated with a web page received by the first digital device from the network device.

19. A non-transitory computer readable storage medium configured to store instructions, the instructions comprising a method, the method comprising the steps of:
    receiving, by a first digital device, a network identifier from a network device, the network device configured to provide network access to the first digital device;
    providing, by the first digital device, a first credential request including the network identifier to another digital device on a network;
    receiving, by the first digital device, a request for additional network information from the other digital device;
    providing, by the first digital device, a second credential request including additional network information to the other digital device;
    receiving, by the first digital device, a credential request response including network credentials from the other digital device, the credential request response being based, at least in part, on the additional network information; and
    providing, by the first digital device, the network credentials from the credential request response to the network device, the network credentials to allow or assist in allowing network access to the first digital device.

20. The non-transitory computer readable storage medium of claim 19, wherein the first credential request is formatted as a Domain Name System (DNS) protocol message.

* * * * *